US011827185B2

United States Patent
Hyun et al.

(10) Patent No.: US 11,827,185 B2
(45) Date of Patent: Nov. 28, 2023

(54) ADAPTOR FOR ASSEMBLING WIPER BLADE, WIPER BLADE ASSEMBLY, AND WIPER DEVICE

(71) Applicant: CAP CORPORATION, Gyeongsangbuk-Do (KR)

(72) Inventors: Seung Chul Hyun, Gyeonggi-do (KR); Yun Soo Kim, Gyeongsangbuk-do (KR)

(73) Assignee: CAP Corporation, Gyeongsangbuk-do (KR)

( * ) Notice: Subject to any disclaimer, the term of this patent is extended or adjusted under 35 U.S.C. 154(b) by 228 days.

(21) Appl. No.: 17/087,782

(22) Filed: Nov. 3, 2020

(65) Prior Publication Data

US 2021/0162956 A1     Jun. 3, 2021

(30) Foreign Application Priority Data

Dec. 2, 2019 (KR) .................... 10-2019-0158549

(51) Int. Cl.
*B60S 1/40* (2006.01)

(52) U.S. Cl.
CPC .......... *B60S 1/4003* (2013.01); *B60S 1/4009* (2013.01); *B60S 1/4045* (2013.01); *B60S 1/4067* (2013.01); *B60S 1/4048* (2013.01); *B60S 2001/4022* (2013.01); *B60S 2001/4051* (2013.01); *B60S 2001/4054* (2013.01); *B60S 2001/4058* (2013.01)

(58) Field of Classification Search
CPC .... B60S 1/4006; B60S 1/4003; B60S 1/4045; B60S 1/4048; B60S 2001/4051; B60S 2001/4058; B60S 2001/4061; B60S 2001/4035; B60S 2001/4022; B60S 2001/4054; B60S 1/4067; B60S 1/407; B60S 1/4009
USPC ....................................... 15/250.32
See application file for complete search history.

(56) References Cited

U.S. PATENT DOCUMENTS

| 9,120,463 B2 | 9/2015 | Kim et al. |
| 2015/0258967 A1 | 9/2015 | Lepper et al. |
| 2018/0086312 A1* | 3/2018 | Houssat ............... B60S 1/4006 |

(Continued)

FOREIGN PATENT DOCUMENTS

| CN | 103223923 A | 7/2013 |
| EP | 3339114 A1 | 6/2018 |
| JP | 6177979 B2 | 8/2017 |

(Continued)

OTHER PUBLICATIONS

English language translation of description portion of WO publication 2017/115882, published Jul. 2017. (Year: 2017).*

(Continued)

*Primary Examiner* — Gary K. Graham
(74) *Attorney, Agent, or Firm* — IP & T GROUP LLP

(57) ABSTRACT

Provided are an adaptor for assembling a wiper blade, a wiper blade assembly, and a wiper device. The adaptor for assembling a wiper blade, which is configured to couple the wiper blade to two or more types of wiper arms, includes a body portion coupled to the wiper blade and to which a first type wiper arm is coupled horizontally or to which a second type wiper arm is coupled vertically and a locking portion rotatable provided on the body portion to cover a front end of the wiper arm.

14 Claims, 18 Drawing Sheets

(56) References Cited

U.S. PATENT DOCUMENTS

2019/0077375 A1    3/2019   Goh

FOREIGN PATENT DOCUMENTS

| KR | 10-1196556 B1 | | 11/2012 |
|---|---|---|---|
| KR | 10-1198352 B1 | | 11/2012 |
| WO | 2015/138575 | * | 9/2015 |
| WO | 2017/115882 | * | 7/2017 |

OTHER PUBLICATIONS

Office Action issued by the Korean Intellectual Property Office dated Mar. 2, 2021.
Office Action for the Chinese Patent Application No. 202011300642.5 issued by the Chinese Patent Office dated Aug. 31, 2023.

* cited by examiner

ADAPTOR FOR ASSEMBLING WIPER BLADE, WIPER BLADE ASSEMBLY, AND WIPER DEVICE

CROSS-REFERENCE TO RELATED APPLICATION

This application claims priority to and the benefit of Korean Patent Application No. 10-2019-0158549, filed on Dec. 2, 2019, the disclosure of which is incorporated herein by reference in its entirety.

BACKGROUND

1. Field of the Invention

The present invention relates to an adaptor for assembling a wiper blade, a wiper blade assembly, and a wiper device, and more particularly, to an adaptor for assembling a wiper blade, which is easily separated from a wiper arm while a great fastening force is secured, a wiper blade assembly, and a wiper device.

2. Discussion of Related Art

Generally, a wiper device is installed in a vehicle or the like to clean a surface of a windshield. The wiper device may include a wiper motor, a wiper arm, a wiper blade, and the like, and an adaptor may be used for a structural connection between the wiper arm and the wiper blade.

The wiper arm is connected to a rotational shaft of the wiper motor at a bottom end and reciprocates due to the wiper motor. One or more wiper arms are provided according to a size of the windshield. When a plurality of wiper arms are provided, they are provided not to interfere pith each other in rotation.

In addition, the wiper blade may be separably coupled to an end of the wiper arm through the adaptor. The wiper blade is provided in a linear shape, remains in a state of being pressed against the windshield, and slides against and wipes the surface of the windshield due to movement of the rotating wiper arm.

Since the wiper blade is rubbed continuously against the windshield while being installed in the vehicle, as time passes, the wiper blade may be worn, generate unnecessary noise, or decrease in performance of cleaning the surface.

Accordingly, it is necessary to continuously replace the wiper blade. Here, a user of the vehicle separates an existing wiper blade from the wiper arm and then fastens a new wiper blade using the adaptor.

However, since the wiper arm has a variety of shapes depending on a type thereof, an adaptor having a suitable shape for the wiper arm is necessary. Also, it is necessary for the adaptor to easily replace the wiper blade and to stably maintain the wiper blade fastened to the wiper arm in a state of being pressed against the windshield despite windage resistance.

Accordingly, in consideration of a shape of the wiper arm, a structure of the adaptor configured to effectively connect the wiper blade to the wiper arm has been developed greatly.

SUMMARY OF THE INVENTION

The present invention is provided to providing an adaptor for assembling a wiper blade, which has a convenient structure configured to firmly fasten different types of wiper arms, a wiper blade assembly, and a wiper device.

According to an aspect of the present invention, there is provided an adaptor for assembling a wiper blade which is configured to couple the wiper blade to two or more types of wiper arms. The adaptor includes a body portion coupled to the wiper blade and to which a first type wiper arm is coupled laterally or to which a second type wiper arm is coupled vertically and a locking portion rotatably provided on the body portion to cover a front end of the wiper arm. Here, in the body portion, a restriction protrusion protruding to face a front end of the first type wiper arm fastened to the body portion is provided on a side surface, and a groove configured to guide and hold an internal protrusion provided inside the second type wiper arm fastened to the body portion is provided in the side surface. Also, the groove is provided to be biased in a direction farther from the restriction protrusion toward an outside portion into which the internal protrusion is inserted in comparison to an inside portion where the insertion of the internal protrusion is blocked.

The groove may include a guide path including the outside portion into which the internal protrusion is inserted and the inside portion where the insertion of the internal protrusion is blocked and a holding path bent from the guide path and extending horizontally.

The guide path may be provided to be tilted toward the locking portion from the outside portion toward the inside portion, and the holding path may be bent at the guide path at an acute angle and extend horizontally.

In the groove, a distance between the restriction protrusion and a front end most adjacent to the locking portion may be provided to be smaller than a distance between the internal protrusion of the second type wiper arm and a front end of the second type wiper arm.

In the body portion, a hinge portion may be provided in front so that the locking portion rotates and an elastic leg, which is elastically protruding and being held by a rear end of the first type wiper arm, may be provided in the rear.

The hinge portion may include a hinge shaft fastened to the locking portion and a holding key held by an uneven portion of the locking portion depending on a rotational angle of the locking portion to restrict rotation of the locking portion.

When the uneven portion elastically moves due to an external pressure, the uneven portion may be separated from the holding key so that the locking portion may be allowed to rotate in a direction in which the front end of the wiper arm is exposed.

In the body portion, an elastic arm, which comes into contact with inner surfaces of the wiper arms having different widths and coupled to the body portion and is elastically introduced inward, may be provided on the side surface.

In the elastic arm, the front end adjacent to the locking portion may be provided in a form of a free end, and the front end may have a shape protruding outward.

The adaptor may further include a spacer portion disposed to be overlapped with the side surface of the body portion to compensate for a gap between the side surface of the body portion and a third type wiper arm having a great width in comparison to the first type wiper arm or the second type wiper arm when the third type wiper arm is fastened, and wherein an incision portion provided to mount the spacer portion is provided on the top surface of the body portion.

In the body portion, a through hole, into which a pin of a third type wiper arm fastened widthwise is inserted, may be provided on the side surface.

The spacer portion may include a pair of layer portions overlapped with both side surfaces of the body portion and a leg portion configured to connect the pair of layer portions and introduced into the incision portion, and the layer portions each have a shape with a caved portion corresponding to a through hole.

The adaptor may further include a cover portion which is fastened to the body portion to cover both side surfaces and a top surface of the body portion, which is provided to have a width corresponding to that of the locking portion, and which includes an opening at a part corresponding to a through hole.

In the body portion, a curved portion may be provided between both side surfaces to hold a third type wiper arm having a ring-shaped front end.

According to another aspect of the present invention, there is provided a wiper blade assembly including a wiper blade including a contact member, which is pressed against a surface of a target to be pressed against, and the adaptor according to any one of claims 1 to 14 which is fastened to the wiper blade. Here, the adaptor may further include a base portion fixed to the wiper blade, and the body portion may be fastened to the base portion to hinge-rotate.

The body portion may include a pair of hinge holes provided in both side surfaces, and the base portion may include a bar-shaped rotational shaft passing through the pair of hinge holes at once or a rotational shaft having a shape of a pair of protrusions which are fastened to the pair of hinge holes, respectively.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
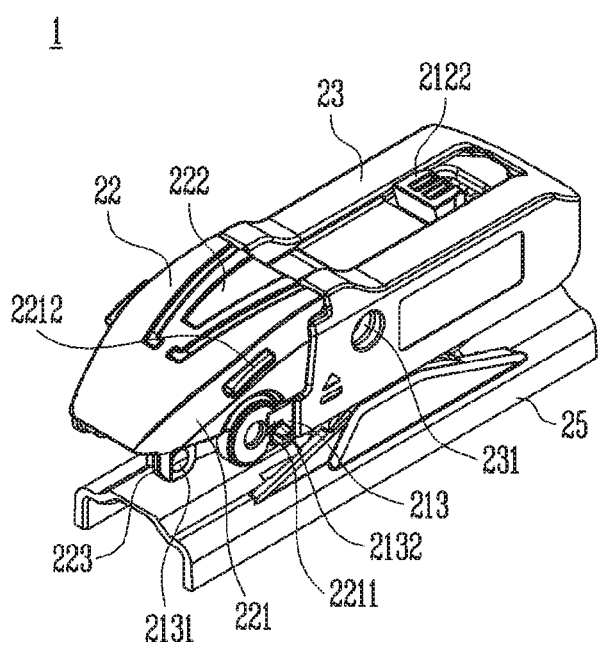
FIGS. 1 and 2 are perspective views of an adaptor according to one embodiment of the present invention.

The aspects, particular advantages, and novel features of the present invention will become apparent from a detailed description of exemplary embodiments with reference to the attached drawings. While reference numerals are given to components of each drawing, it should be noted that although shown in different drawings, like components will be referred to as like reference numerals if possible. Also, in a description of the embodiments of the present invention, a detailed description of well-known components or functions of the related art will be omitted when it is deemed to obscure understanding of the embodiments of the present invention.

Also, for reference, it should be noted that fine differences which may exist between the drawings included in the specification may be construed as forming different embodiments included in the present invention.

Figure 2:
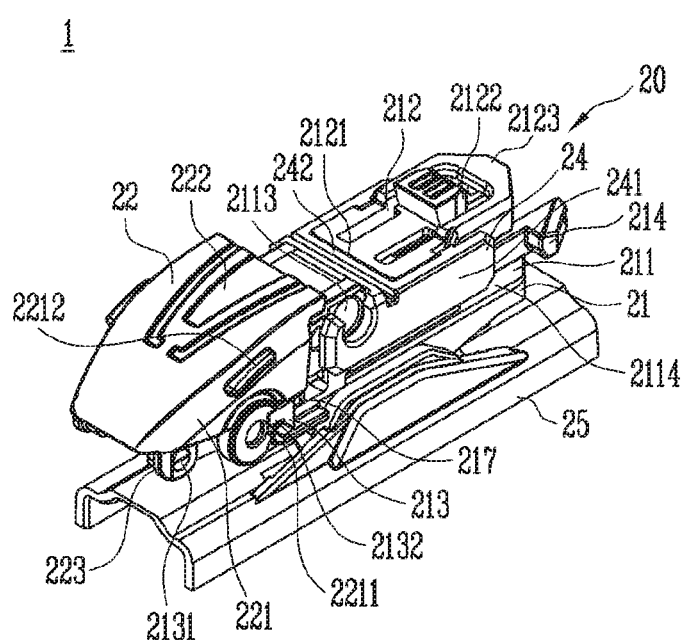
Figure 3:
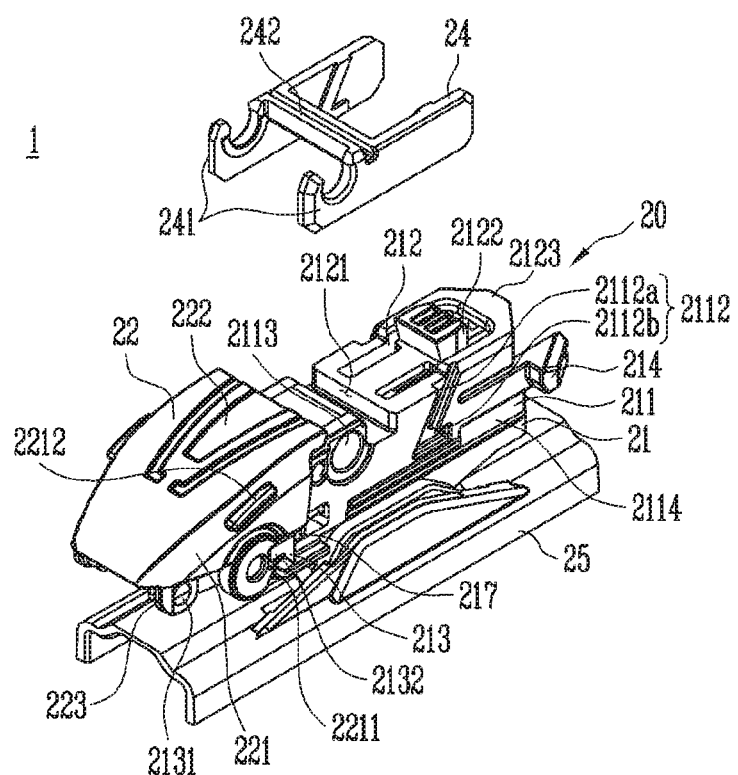
FIGS. 3 and 4 are exploded-perspective views of the adaptor according to one embodiment of the present invention.
Figure 4:
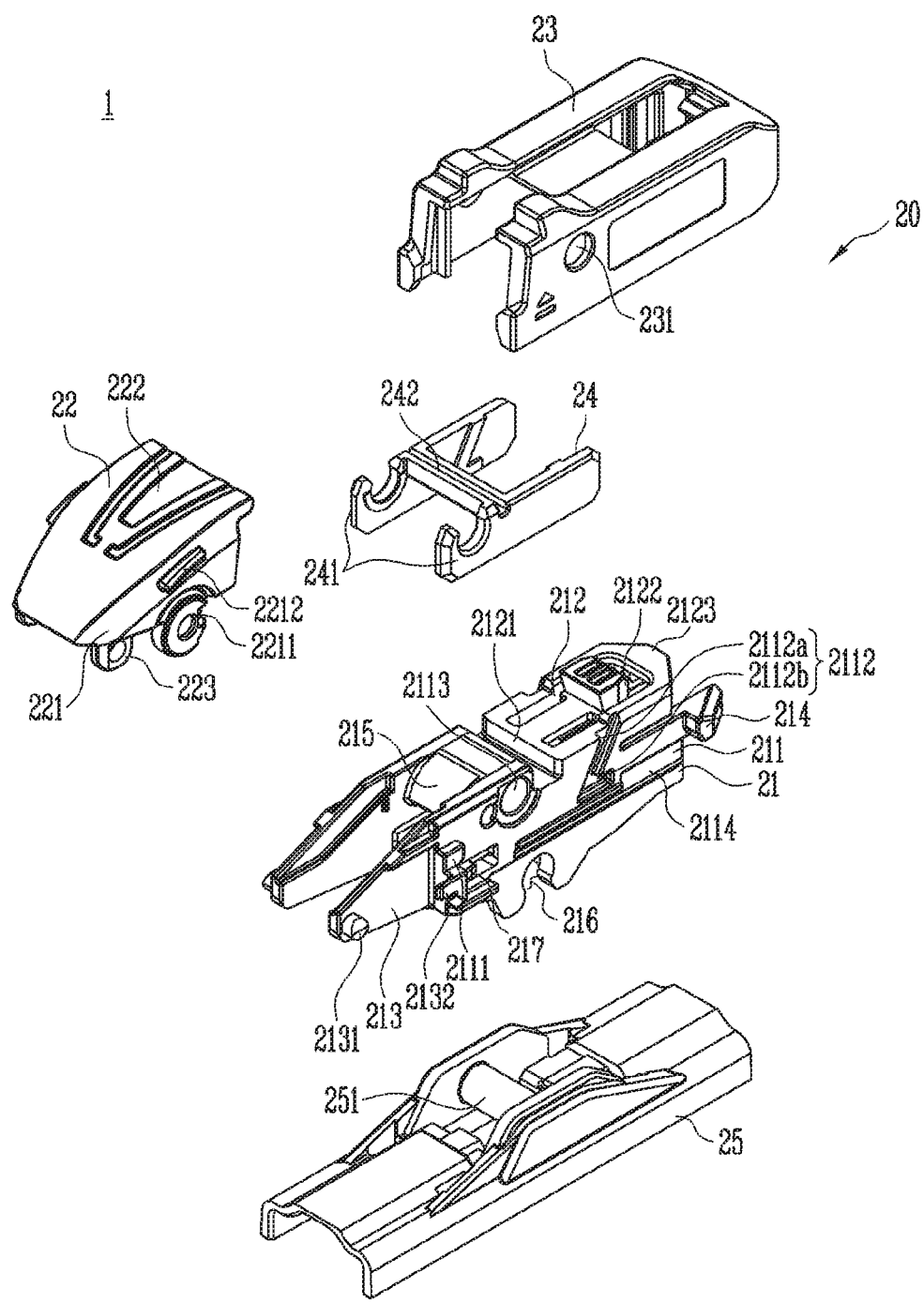
Figure 5:
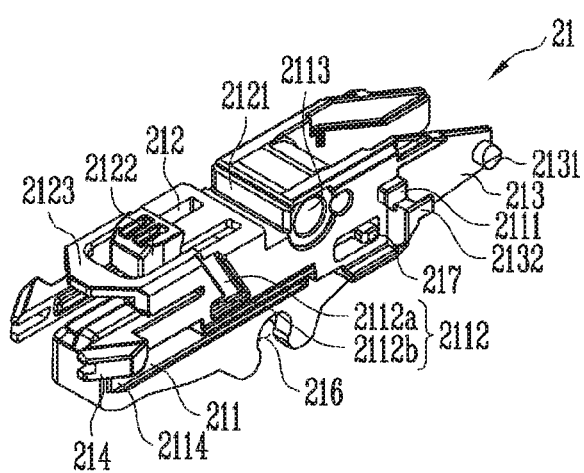
FIGS. 5 and 6 are partial perspective views of the adaptor according to one embodiment of the present invention.
Figure 6:
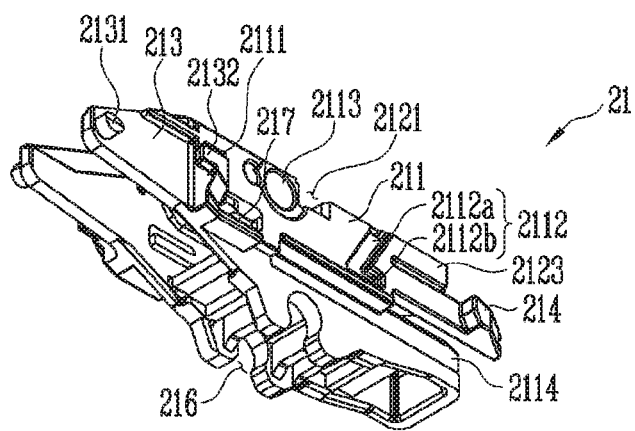

FIGS. 1 and 2 are perspective views of an adaptor according to one embodiment of the present invention, FIGS. 3 and 4 are exploded-perspective views of the adaptor according to ne embodiment of the present invention, and FIGS. 5 and 6 are partial perspective views of the adaptor according to one embodiment of the present invention.

Figure 7:
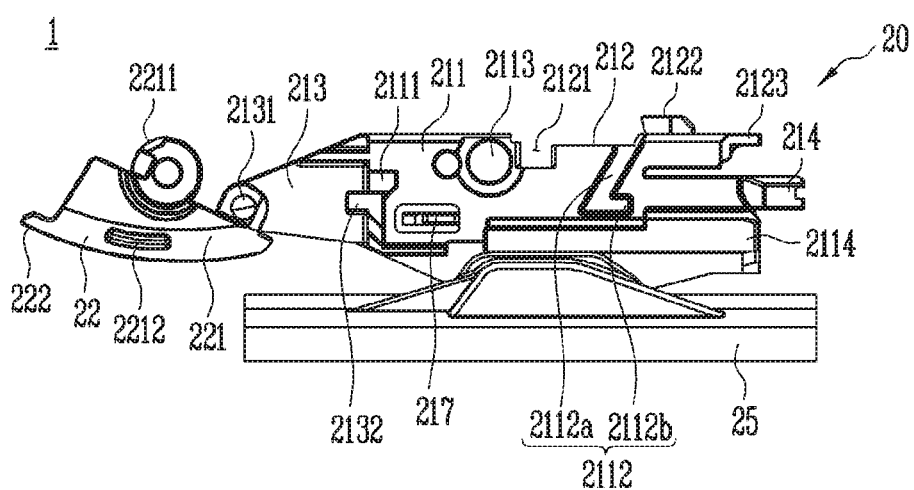
FIG. 7 is a perspective view of the adaptor according to one embodiment of the present invention.
Figure 8:
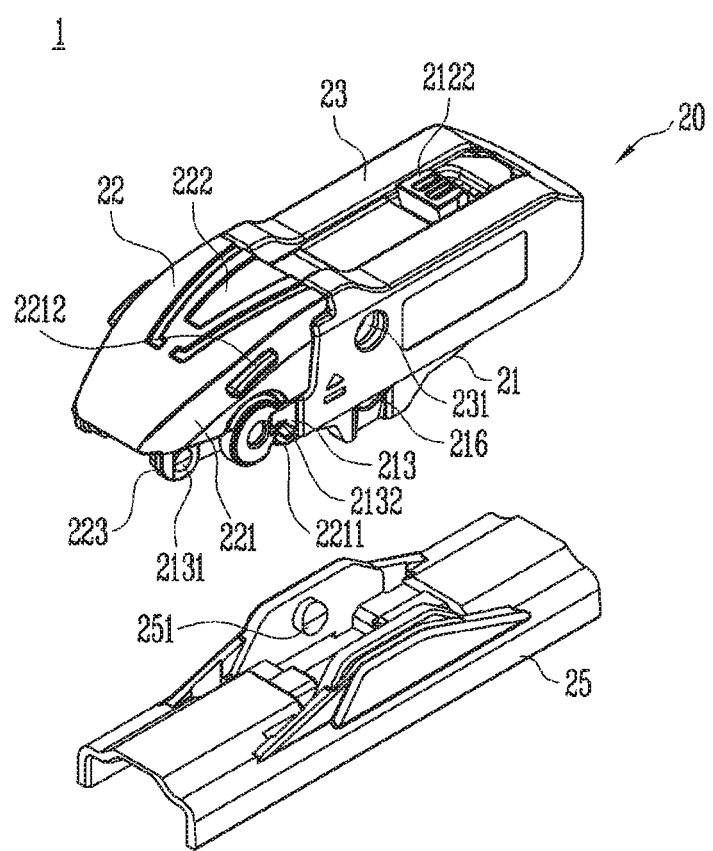
FIG. 8 is an exploded-perspective view of the adaptor according to one embodiment of the present invention.
Figure 9:
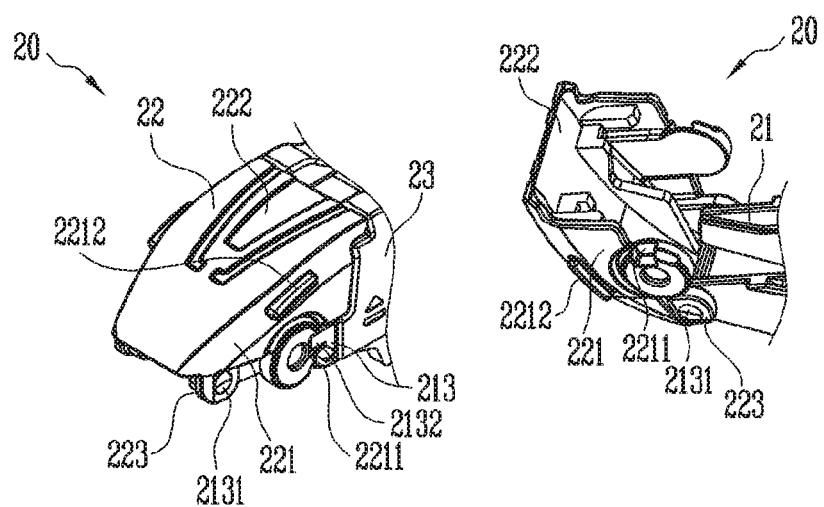
FIGS. 9 and 10 are partial perspective views of the adaptor according to one embodiment of the present invention.
Figure 10:
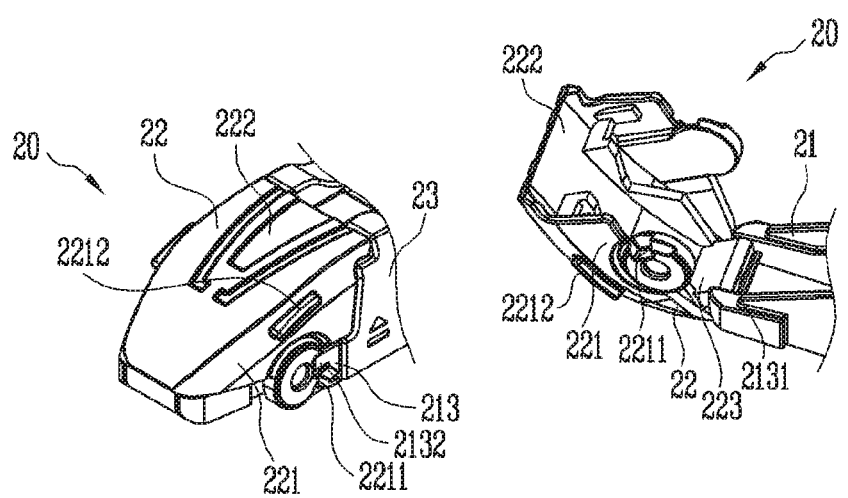

Also, FIG. 7 is a perspective view of the adaptor according to one embodiment of the present invention, FIG. 8 is an exploded-perspective view of the adaptor according to one embodiment of the present invention, and FIGS. 9 and 10 are partial perspective views of the adaptor according to one embodiment of the present invention.

Also, FIGS. 11 to 18 are views illustrating a method of assembling a wiper blade assembly according to one embodiment of the present invention.

For reference, hereinafter, for convenience, it will be described that frontward/front end means a left side in FIG. 1 and rearward/rear end means a right side in FIG. 1. An outside means a far side from a target to be pressed against (a windshield and the like of a vehicle) on the basis of an adaptor 20 (an upper side in the case of FIG. 1), and an inside means a close side to the target to be pressed against in the adaptor 20 (a lower side in the case of FIG. 1).

In addition, the terms having directivity may be construed as being on the basis of the drawings. However, since the terms are merely for convenience of description, it should be noted that the right of the present invention will not be unnecessarily construed restrictively due to the terms.

Before describing the adaptor 20 of the present invention, a wiper device 1 and the like according to the present invention will be described first with reference to FIG. 1 and the like.

The present invention includes the wiper device 1. The wiper device 1 includes a wiper blade (not shown), a wiper arm 10, and a wiper-blade-assembling adaptor 20 (hereinafter, referred to as the adaptor 20).

For reference, in the specification, a wiper blade assembly may mean a combination between the wiper blade and the adaptor 20.

The wiper blade included in the wiper device 1 of the present invention is pressed against a surface of a target to be pressed-against and cleans the surface of the target through movement. The target to be pressed-against may be a windshield of a vehicle but is not limited thereto, and all objects to be cleaned by sliding may become targets to be pressed-against.

Also, the surface against which the wiper blade is pressed may be a flat surface, a curved surface, or the like, and the wiper blade may have a shape corresponding to a shape of the surface of the target.

The wiper blade may include a contact member (not shown), which has a V-shaped cross section, includes an elastic material, and slides along a surface of a target to be pressed-against while being pressed against the target directly, an elastic member (not shown) configured to apply an elastic force to the contact member so as to deform a contact side of the contact member to coincide with the surface of the target, a cover member (not shown) provided on an opposite side to the contact member on the basis of the elastic member, and a coupling cover (not shown) configured to be coupled to the adaptor 20.

However, in the specification, since the wiper blade may be a structure including conventionally well-known components, a detailed description will be omitted below.

Also, the adaptor 20 of the present invention which will be described below may be fastened to the wiper blade using an unlimited variety of methods, and there is no limitation in a structure as long as it is possible to fasten the wiper blade to be rotatable on the basis of the adaptor 20.

The wiper arm 10 rotates about a base end and has an end, to which the wiper blade is connected, and transmits a rotational force to the wiper blade so as to implement cleaning of the target using the wiper blade.

The wiper arm 10 includes an arm portion and a connection portion. In the arm portion, a driving source (motor or the like) configured to rotate the wiper arm 10 is connected to the base end directly or indirectly so that an end of the arm portion rotates due to a rotational force of the driving source while drawing an arc.

The arm portion may have a bar shape extending between the base end and the end and may include a metal material for durability but a material thereof is not limited thereto. Also, any one of a variety of shapes will be available as long as the shape is capable of connecting the base end to the end and may include a part bent or twisted one time or more.

In the arm portion, the connection portion is coupled to the end. The connection portion is a component for connecting the wiper arm 10 to the adaptor 20 and may have a shape which differs according to a type of the wiper arm 10.

The adaptor 20 of the present invention may be configured to couple two or more types of such wiper arms 10 selectively. That is, in the specification, the wiper arm 10 may include two or more types. Hereinafter, a first wiper arm 10a to an eighth wiper arm 10h will be described with reference to FIGS. 11 to 18.

Figure 11:
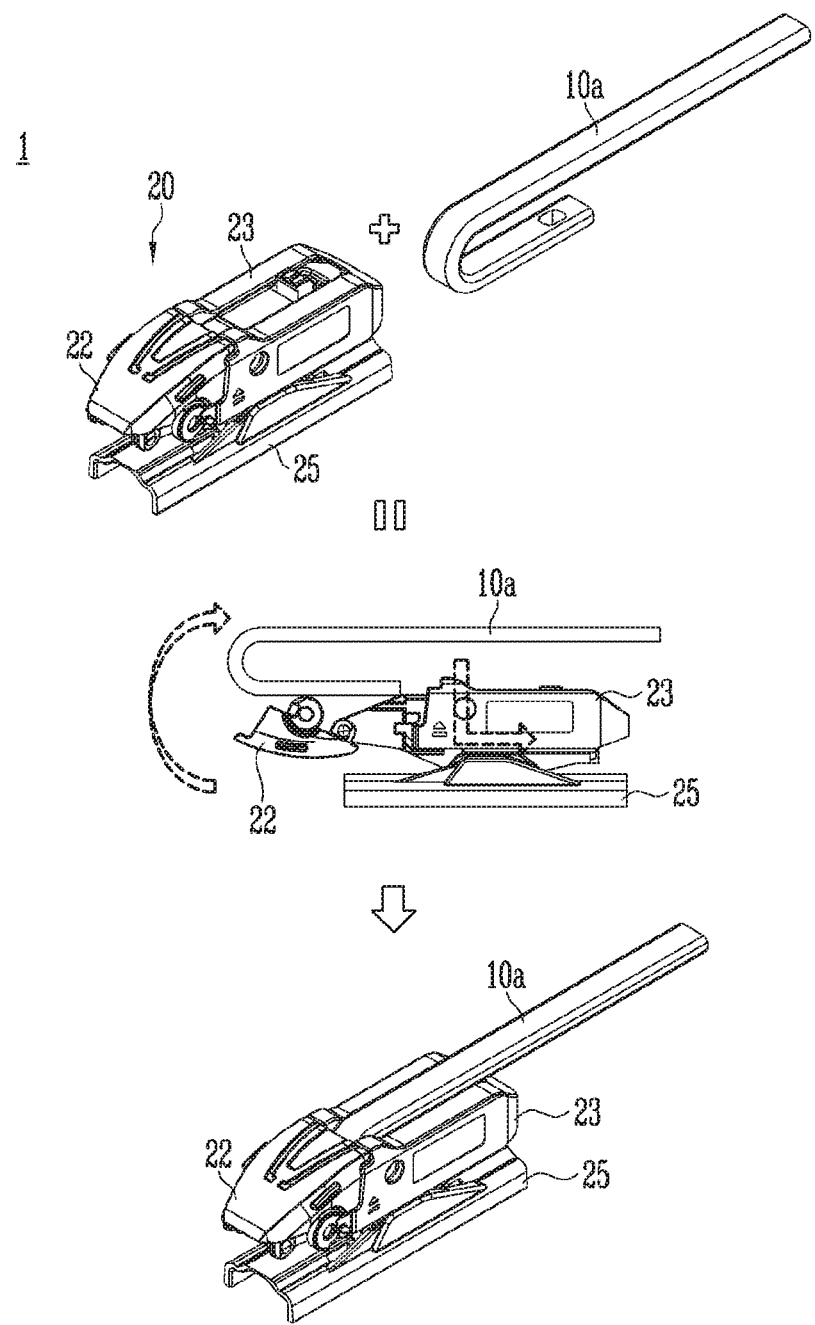
FIGS. 11 to 18 are views illustrating a method of assembling a wiper blade assembly according to one embodiment of the present invention.

Referring to FIG. 11, the first wiper arm 10a includes an arm portion having a relatively small width in comparison to the adaptor 20 and includes a connection portion extending from the arm portion with the same width continuously. Here, the connection portion may form a ring shape which extends in a direction away from the arm portion while being parallel to the arm portion and is bent in a direction facing the arm portion.

That is, the connection portion of the first wiper arm 10a may include an upper part and a lower part which have linear shapes parallel to each other and a convex part configured to connect the upper part to the lower part, and an uneven part for reinforcing a fastening force to the adaptor 20 may be applied therebelow.

The first wiper arm 10a may be the wiper arm 10 which is fastened to the adaptor 20 vertically, and a detailed fastening method will be described below.

Figure 12:
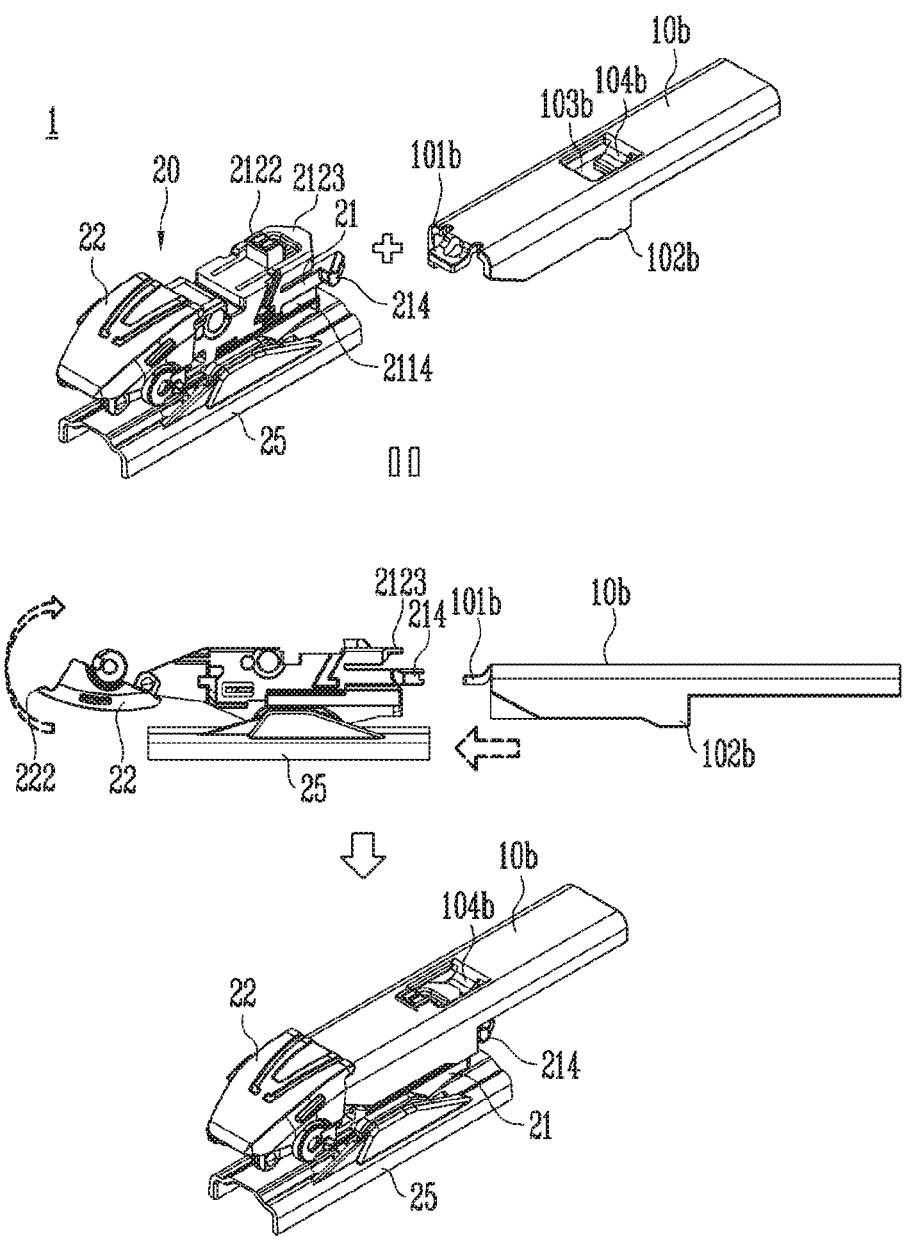

Referring to FIG. 12, in a second wiper arm 10b, an arm portion may have a staple-shaped cross section to have strength which braces for bending. Also, a connection portion of the second wiper arm 10b may extend continuously with the arm portion, have a cross section having the same shape as that of the arm portion, and include a protruding end 101b protruding from a base end.

The protruding end 101b extends from a front end of a top surface of the connection portion to be curved or bent and has a width smaller than that of the top surface so as to be introduced into a locking portion 22 of the adaptor 20, Which will be described below, and be mounted on the adaptor 20.

Also, an opening 103b may be provided in a top surface of the second wiper arm 10b, and an insertion piece 104b may be provided in the opening 103b. When the second wiper arm 10b is inserted into the adaptor 20, the insertion piece 104b is introduced into a bottom of an elastic piece 2123 and engaged with the elastic piece 2123 so as to suppress an upward separation of the second wiper arm 10b.

A side surface of the connection portion may be provided to be higher than a side surface of the arm portion. That is, a bottom of the side surface of the connection portion extends to be located below a bottom end of the side surface of the arm portion. Here, a side from the bottom end of the side surface of the connection portion to a rear end may form a holding end 102b.

The second wiper arm 10b may be the wiper arm 10 fastened to the adaptor 20 horizontally. The second wiper arm 10b may move horizontally until a front side of the side surface of the connection portion comes into contact with a restriction protrusion 2111 provided on the adaptor 20 and may be fastened thereto. When the second wiper arm 10b is fastened to the adaptor 20 so that the front side of the second wiper arm 10b comes into contact with the restriction protrusion 2111, the holding end 102b of the second wiper arm 10b passes over an elastic leg 214 provided on the adaptor 20 and the elastic leg 214 restricts movement of the wiper arm 10b in a direction of being separated.

It is sufficient that the holding end 102b has a shape which forms a step between the connection portion and the arm portion, a detailed shape or structure may be freely modified.

Figure 13:
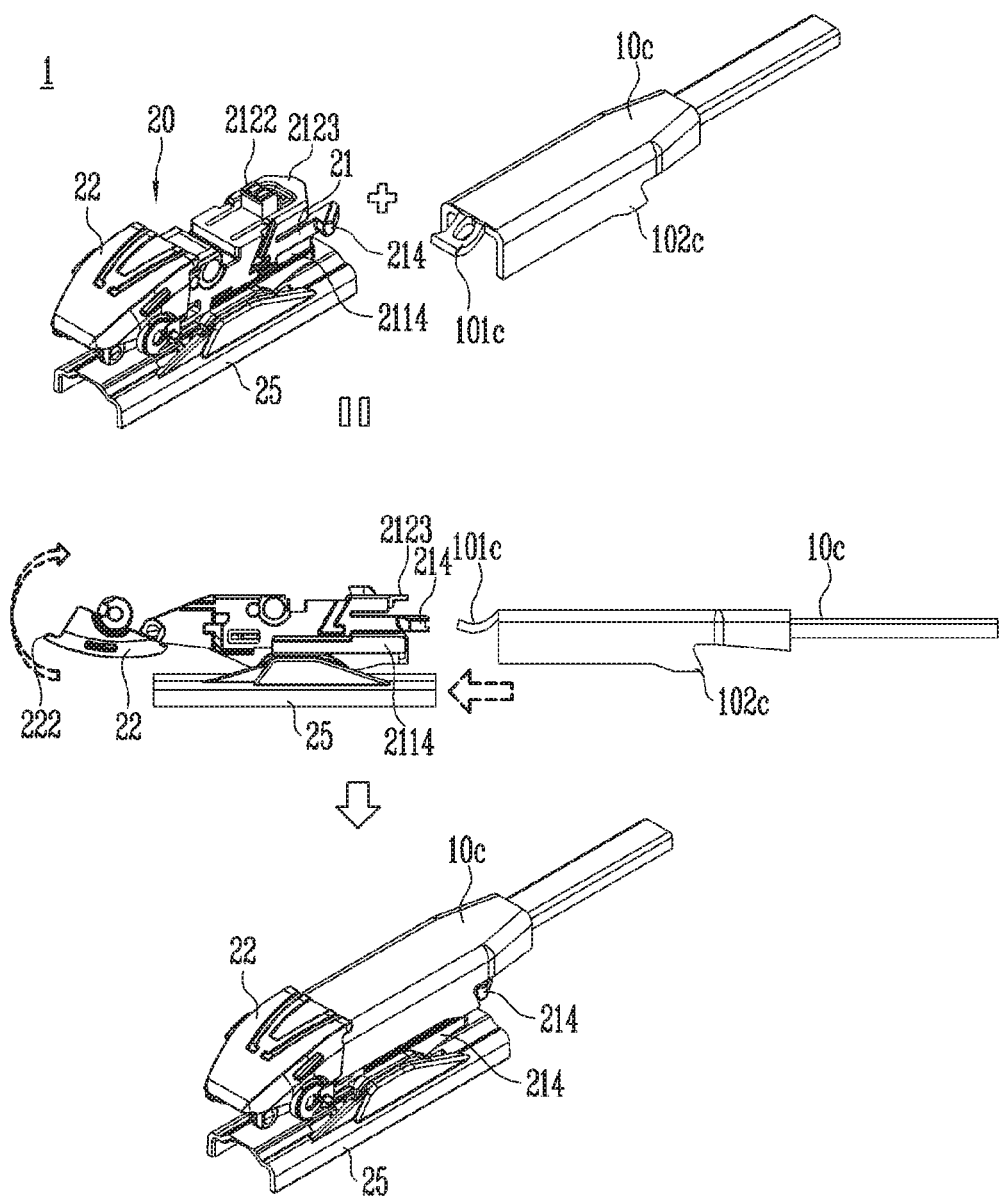

Referring to FIG. 13, a third wiper arm 10c has an arm portion similar to that of the first wiper arm 10a and has a connection portion having a shape similar to that of the second wiper arm 10b. Here, the connection portion of the third wiper arm 10c may include a protruding end 101c and a holding end 102c.

The connection portion of the third wiper arm 10c may have a front end of a side surface different from that of the second wiper arm 10b. In the case of the second wiper arm 10b, a chamfer may be formed on the front side of the side surface. However, in the third wiper arm 10c, a front side of the side surface may be provided vertically. Nevertheless, an uppermost limit in horizontal movement of both of the second wiper arm 10b and the third wiper arm 10c may be set by the restriction protrusion 2111.

That is, as described above, when the third wiper arm 10c is fastened to the adaptor 20 horizontally, movement of the front side of the third wiper arm 10c may be restricted by the restriction protrusion 2111 provided on the adaptor 20 and the holding end 102c of the third wiper arm 10c is held by the elastic leg 214.

Accordingly, like the second wiper arm 10b, in the third wiper arm 10c, the restriction protrusion 2111 and the front side face each other in a leftward direction so as to be restricted in movement of the third wiper arm 10c and the holding end 102c is held by the elastic leg 214 in a rightward direction to be restricted in movement of the third wiper arm 10c.

Figure 14:
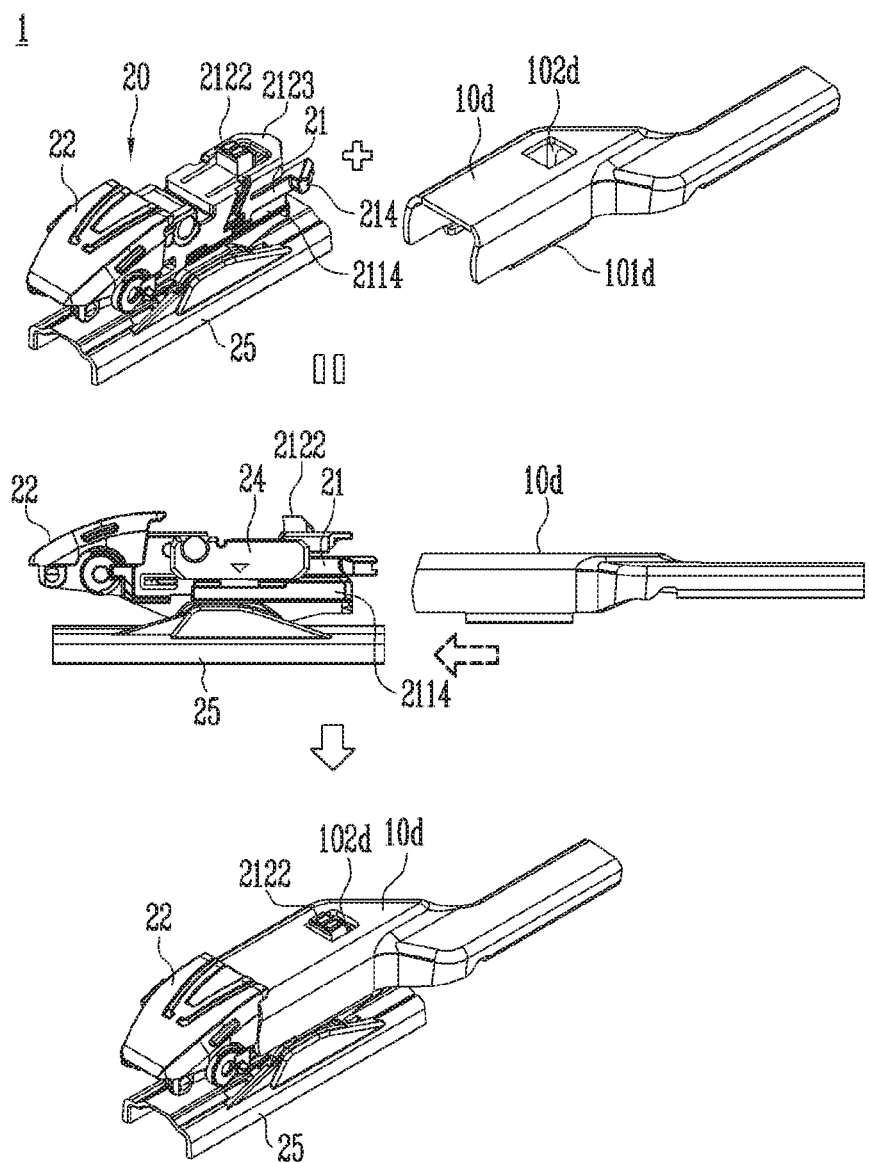

Referring to FIG. 14, a fourth wiper arm 10d includes an arm portion having a staple-shaped cross section with a bottom end of a side surface which is bent or curved inward and includes a connection portion extending to be biased toward one side in comparison to a longitudinal direction of the arm portion.

Here, an internal protrusion 101d bent inward may be provided at the bottom end of the side surface in the connection portion. When the fourth wiper arm 10d is fastened to the adaptor 20 horizontally, the internal protrusion 101*d* may be guided by a first guide path 2112*a* of the adaptor 20.

An opening 102*d* may be provided in a top surface in the connection portion of the fourth wiper arm 10*d*, and an elastic protruding portion 2122 of the adaptor 20 may be mounted in the opening 102*d*.

Also, in the fourth wiper arm 10*d*, the connection portion may have an inner width that is relatively great in comparison to those of other types of wiper arms 10. In this case, the adaptor 20 may prevent a fastening force from decreasing due to a gap formed between the fourth wiper arm 10*d* and the adaptor 20 using a spacer portion 24.

Figure 15:
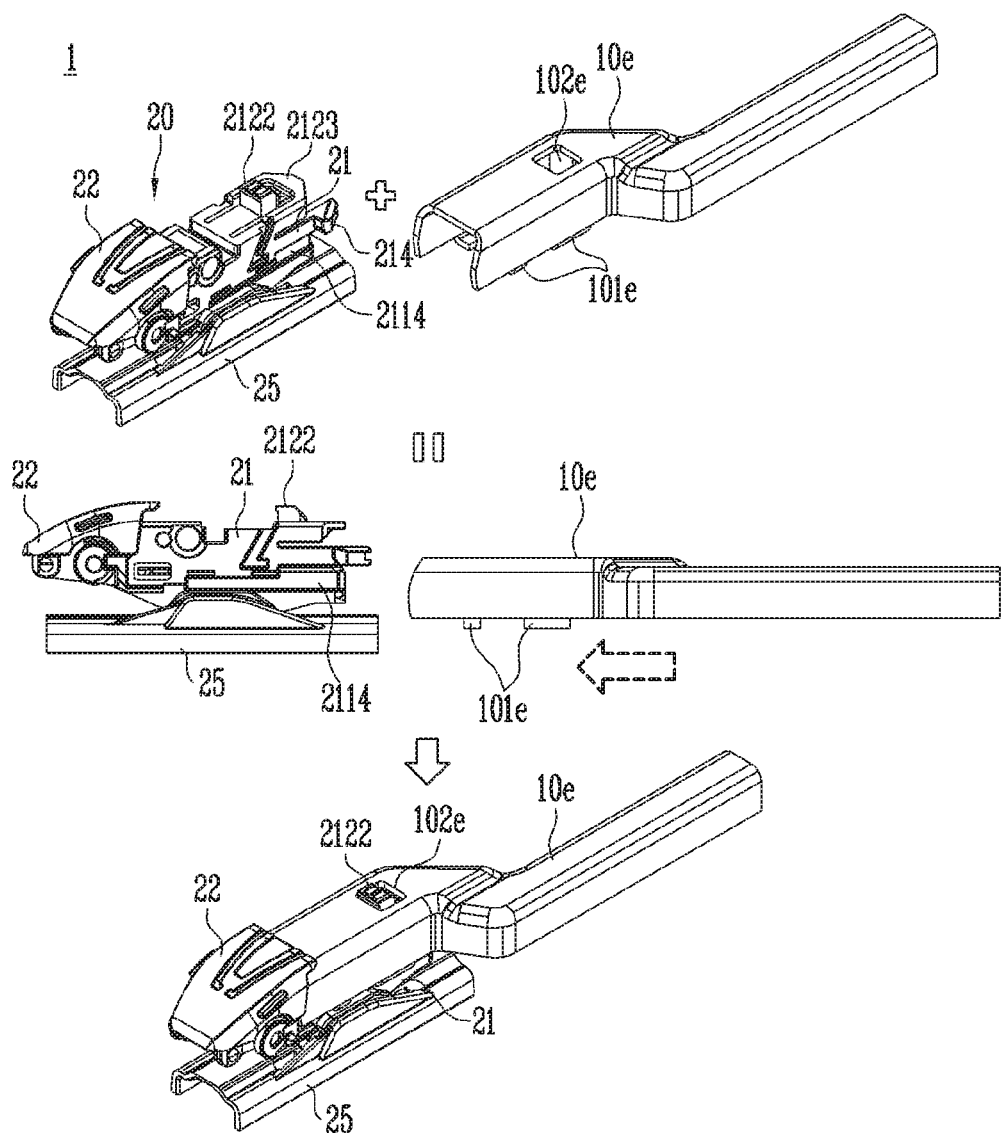

Referring to FIG. 15, a fifth wiper arm 10*e* may have a form similar to that of the fourth wiper arm 10*d* but has a width smaller than that of the fourth wiper arm 10*d* so that the fifth wiper arm may be fastened to the adaptor 20 without the spacer portion 24.

Figure 16:
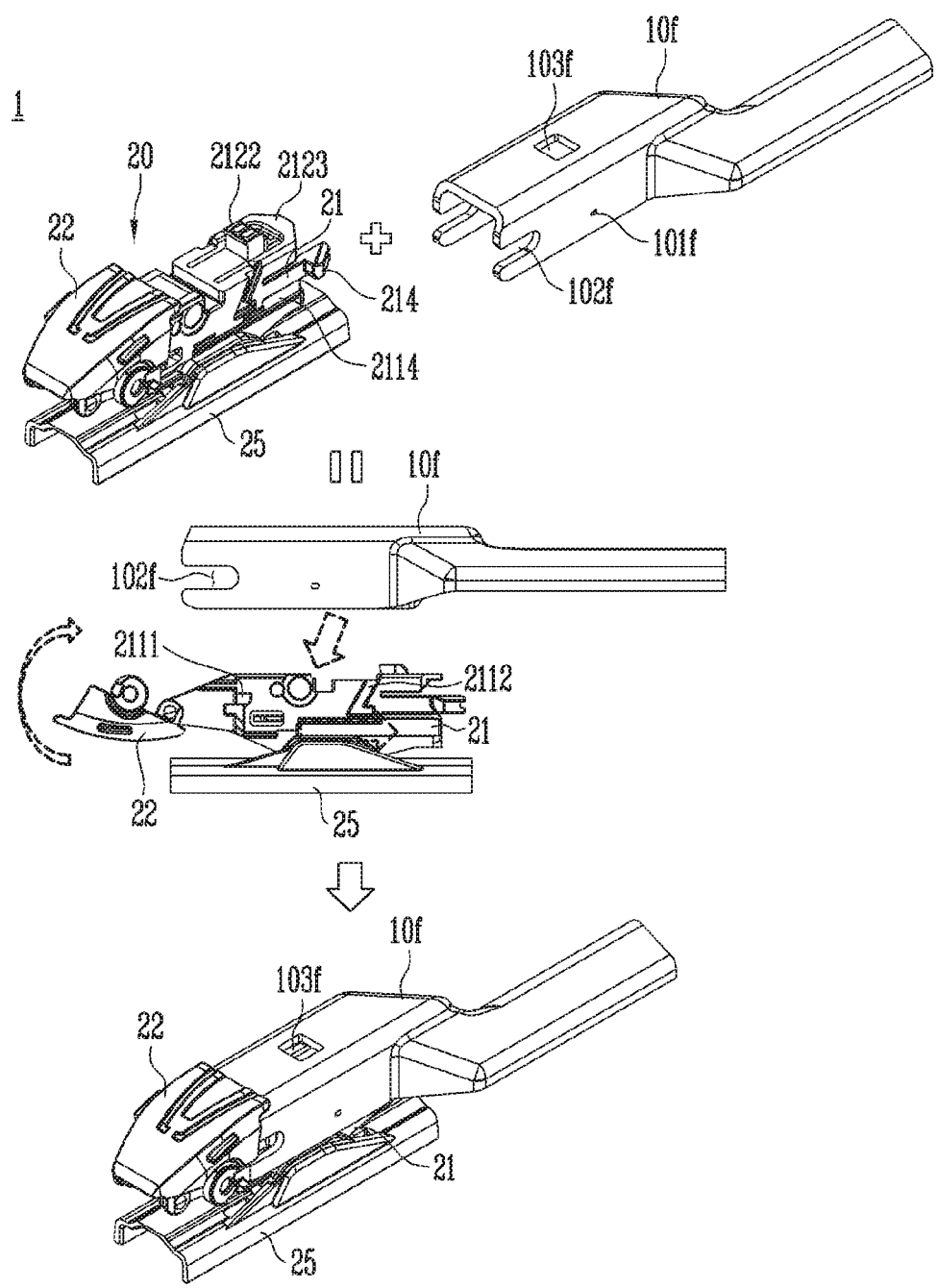

Referring to FIG. 16, a sixth wiper arm 10*f* may be similar to the fourth wiper arm 10*d* or the fifth wiper arm 10*e*. However, an internal protrusion 101*f* may be provided at a certain point inward from a side surface of a connection portion.

Here, the internal protrusion 101*f* may move along a first guide path 2112*a* of the adaptor 20 to allow the sixth wiper arm 10*f* to be fastened. However, since the first guide path 2112*a* has a tilted shape, the sixth wiper arm 10*f* may be fastened in a direction different from that of the first wiper arm 10*a* while being fastened to the adaptor 20 in a vertical direction. This will be described below in detail.

Also, the sixth wiper arm 10*f* may have a recessed portion 102*f* at a front side of the side surface of the connection portion and may be used for a part on which the restriction protrusion 2111 is provided on a side surface 211 of the adaptor 20.

Figure 17:
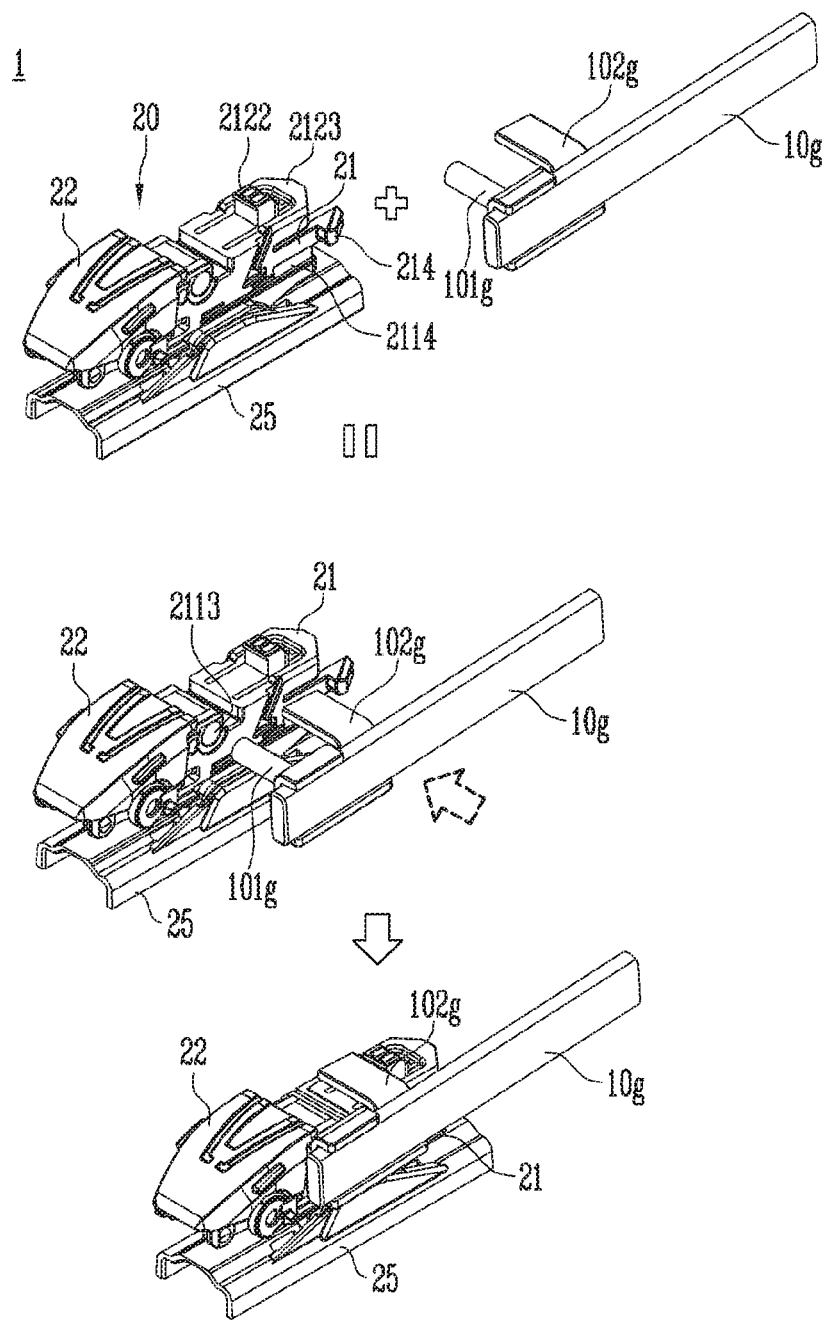

Referring to FIG. 17, a seventh wiper arm 10*g* may have an arm portion having a shape with a height which is great in comparison to a width, and a connection portion extending from the arm portion may have a pin 101*g* extending from one side in a width direction.

Here, when the seventh wiper am 10*g* is fastened to the adaptor 20 in the width direction, the pin 101*g* may be inserted into a through hole 2113 provided in the adaptor 20.

Also, in the connection portion of the seventh wiper arm 10*g*, a lid portion 102*g* on a top side may extend in the same direction as that of the pin 101*g* and be provided at a position deviating from the pin 101*g* in a front-rear direction. The lid portion 102*g* may be mounted on a top surface 212 of the adaptor 20 and be provided to have a shape bent at least one time to surround the adaptor 20.

Figure 18:
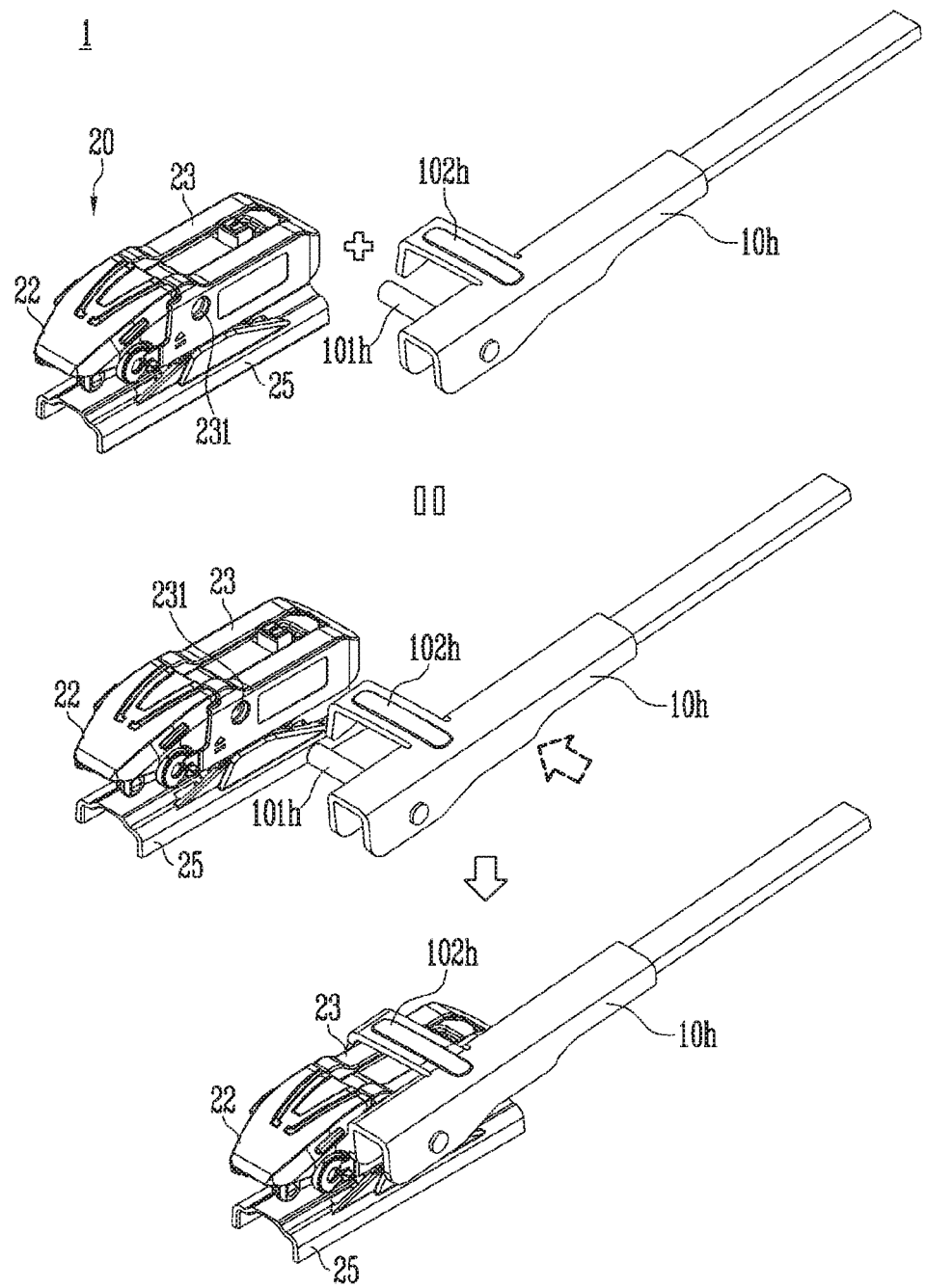

Referring to FIG. 18, an eighth wiper arm 10*h* has differences in cross-sectional shapes of a connection portion and an arm portion in comparison to the seventh wiper arm 10*g* but is fastened to the adaptor 20 using a pin 101*h* and a lid portion 102*h* similarly to the seventh wiper arm 10.

In the case of the eighth wiper arm 10*h*, in comparison to the seventh wiper arm 10*g*, since the lid portion 102*h* has a great width, when the eighth wiper arm 10*h* is fastened to the adaptor 20, it may be necessary to use the spacer portion 24 or a cover portion 23, unlike when the seventh wiper arm 10*g* is fastened.

Hereinafter, the adaptor 20 of the present invention will be described with reference to FIG. 1 or the like.

As shown in FIGS. 1 to 10, in the adaptor 20 according to one embodiment of the present invention, a wiper blade may be coupled to a lower side and two or more types of wiper arms 10 are selectively fastened to an upper side so as to be used for connecting the two or more types of wiper arms 10 to the wiper blade.

The adaptor 20 includes a body portion 21, a locking portion 22, the cover portion 23, the spacer portion 24, and a base portion 25.

The body portion 21 may be connected to the wiper blade directly or indirectly through the base portion 25 which will be described below. A first type wiper arm 10 may be coupled horizontally or a second type wiper arm 10 may be coupled vertically.

Here, the first type wiper arm 10 may be the second wiper arm 10*b* to the fifth wiper arm 10*e* and the like, and the second type wiper arm 10 may be the first wiper arm 10*a*, the sixth wiper arm 10*f*, and the like. For reference, although expressed as an "nth type wiper arm 10," the wiper arm 10 may be construed as one wiper arm 10 and not a plurality of wiper arms 10.

For reference, a third type wiper arm 10 may be fastened to the adaptor 20 widthwise. Here, the third type wiper arm 10 may include the seventh wiper arm 10*g*, the eighth wiper arm 10*h*, and the like.

The body portion 21 includes a pair of such side surfaces 211, the top surface 212, and the like. The pair of side surfaces 211 and the top surface 212 may be partially covered by the connection portion of the wiper arm 10 when the wiper arm 10 is fastened.

Also, components for implementing fastening and separation of the wiper arm 10 may be applied to each of the side surfaces 211 and the top surface 212, which will be described below.

The restriction protrusion 2111 is provided on the side surface 211 of the body portion 21 at a position adjacent to the locking portion 22. The restriction protrusion 2111 may protrude from the side surface 211 of the body portion 21 to face a front end of the side surface of the connection portion of the first type wiper arm 10 (particularly, the third wiper arm 10*c* or the like) fastened to the body portion 21 horizontally.

Also, a first groove 2112 is provided on one side far from the locking portion 22 on the basis of the restriction protrusion 2111 on the side surface 211 of the body portion 21. The first groove 2112 may be recessed from the side surface 21 of the body portion 211 so that the internal protrusion 101*f* provided inside the second type wiper arm 10 (particularly, the sixth wiper arm 10*f* or the like) fastened to the body portion 21 vertically is guide and held.

Also, the through hole 2113 passing through the side surface 211 may be provided in the body portion 21, In the through hole 2113, the pin 101*g* or 101*h* of the third type wiper arm 10 (the seventh wiper arm 10*g*, the eighth wiper arm 10*h*, or the like) is fastened to the body portion 21 widthwise is inserted.

Here, a size of the through hole 2113 is provided to correspond to a cross section of the pin 101*g* or 101*h*, and the pin 101*a* or 101*h* inserted in the through hole 2113 may be provided to be unable or able to rotate. The pin 101*a* or 101*h* may have a cylindrical shape to be easily inserted into the through hole 2113. However, separation of the pin 101*g* may be suppressed by the lid portion 102*g* of the seventh wiper arm 10*g* or the like.

Also, in the side surface 211 of the body portion 21, a second groove 2114 configured to guide internal protrusions 101*d* or 101*e* provided inside the first type wiper arm 10 (particularly, the fourth wiper arm 10*d* or the fifth wiper arm 10*e*) fastened to the body portion 21 horizontally may be formed, to be recessed, at a position (for example, a bottom or the like) which does not interfere with the restriction protrusion 2111 and the first groove 2112.

The restriction protrusion 2111 provided on the body portion 21 may protrude from the side surface 211 at a certain height to suppress horizontal insertion of the first type wiper arm 10 fastened to the body portion 21. However, in this case, a position of the second type wiper arm 10 being fastened to the body portion 21 vertically may be restricted by the restriction protrusion 2111.

In detail, due to the restriction protrusion 2111, in the second type wiper arm 10 (hereinafter, the sixth wiper arm 10f), the connection portion is held by the restriction protrusion 2111 in a process of inserting the wiper arm 10 at a position at which a front end of the connection portion is parallel to the restriction protrusion 2111 vertically. Accordingly, in order to fasten the sixth wiper arm 10f to the body portion 21 using the first groove 2112, it is necessary to form an adequate gap between the first groove 2112 and the restriction protrusion 2111.

However, the wiper arm 10 fastened to the body portion 21 is completely fastened by covering the front end using the locking portion 22. When the first groove 2112 is at a position which recedes adequately from the restriction protrusion 2111, the front end of the sixth wiper arm 10f may not be covered by the locking portion 22.

Accordingly, in the present invention, in order to allow both of the first type wiper arm 10 or the second type wiper arm 10 to be fastened using one adaptor 20, a shape of the first groove 2112 may be improved.

As an example, the first groove 2112 may be provided to be biased toward the locking portion 22 toward an inside portion which blocks insertion of the internal protrusion 101f in comparison to an outside portion into which the internal protrusion 101f of the sixth wiper arm 10f is inserted.

In detail, the first groove 2112 may include the guide path 2112a into which the internal protrusion 101f of the sixth wiper arm 10f is inserted and a holding path 2112b which is bent from the guide path 2112a and extends horizontally. The guide path 2112a may include the inside portion which blocks insertion of the internal protrusion 101f from the outside portion into which the internal protrusion 101f is inserted and may be provided to be tilted toward the locking portion 22 from the outside portion toward the inside portion.

In this case, an initial position of the sixth wiper arm 10f at which the internal protrusion 101f of the sixth wiper arm 10f is introduced into the first groove 2112 may recede from a position of the sixth wiper arm 10f at which the internal protrusion 101f of the sixth wiper arm 10f is located on the inside portion of the first groove 2112.

Accordingly, in the embodiment, since the guide path 2112a is provided not to be perpendicular but to be tilted (or bent), a function of restricting horizontal movement of the first type wiper arm 10 using the restriction protrusion 2111 of the body portion 21 may be provided while vertical fastening of the sixth wiper arm 10f may not interfere with the restriction protrusion 2111.

That is, a distance between the restriction protrusion 2111 and the front end (the inside portion of the guide path 2112a), at which the first groove 2112 is most adjacent to the locking portion 22, is provided to be smaller than a distance between the internal protrusion 101f of the sixth wiper arm 10f and the front end.

The internal protrusion 101f of the sixth wiper arm 10f is inserted into the outside portion of the guide path 2112a and moves along the guide path 2112a such that the sixth wiper arm 10f may deviate toward the locking portion 22 in comparison to an initial stage of fastening. In this case, the restriction protrusion 2111 provided on the adaptor 20 may be inserted into the recessed portion 102f formed in the side surface of the connection portion of the sixth wiper arm 10f.

The internal protrusion 101f of the sixth wiper arm 10f may be located on the inside portion of the guide path 2112a and then may recede in a direction farther away from the locking portion 22 such that the internal protrusion 101f may be inserted into the holding path 2112b. Since the holding path 2112b is bent from the guide path 2112a at an acute angle and extends horizontally, vertical movement of the sixth wiper arm 10f is restricted due to the internal protrusion 101f inserted into the holding path 2112b.

Also, since the guide path 2112a of the first groove 2112 is provided to be tilted toward the locking portion 22 in a direction from the outside portion (top end) to the inside portion (bottom end), a position of the holding path 2112b may be disposed to be adjacent to the locking portion 22 by as much as a degree at which the guide path 2112a is tilted in comparison to a case in which the guide path 2112a is vertical. Accordingly, the sixth wiper arm 10f may not be restricted in being fastened to the adaptor 20 due to the restriction protrusion 2111 and simultaneously maintain a fastening force since the front end is covered by the locking portion 22 after being fastened.

The restriction protrusion 2111 provided on the side surface 211 of the body portion 21 blocks horizontal movement of the first type wiper arm 10 fastened to the adaptor 20 horizontally. Also, the first groove 2112 provided on the side surface 211 of the body portion 21 blocks vertical movement of the second type wiper arm 10 fastened to the adaptor 20 vertically through the holding path 2112b extending horizontally.

In addition, as described above, the second groove 2114 may be provided on the side surface 211 of the body portion 21. Here, the second groove 2114 extends horizontally similarly to the holding path 2112b of the first groove 2112. However, the second groove 2114 may be provided to have a shape with an open rear end and be used for fastening the first type wiper arm 10 coupled to the body portion 21 horizontally.

As an example, in the case of the fourth wiper arm 10d or the fifth wiper arm 10e among the first type wiper arms 10 fastened to the body portion 21 horizontally, the internal protrusion 101d or 101e may be provided on a bottom end of the side surface of the connection portion. Here, the internal protrusion 101d or 101e is located below the internal protrusion 101f of the sixth wiper arm 10f.

The fourth wiper arm 10d or the like is fastened to the body portion 21 horizontally. Here, the internal protrusion 101d of the fourth wiper arm 10d or the like is inserted into the second groove 2114 and guided along the second groove 2114.

The fourth wiper arm 10d horizontally moves to a position at which the inside portion of the second groove 2114 comes into contact with the internal protrusion 101d or a position at which the second groove 2114 is adjacent to the internal protrusion 101d. Also, vertical movement of the fourth wiper arm 10d is restricted by the internal protrusion 101d located inside the second groove 2114.

Also, the locking portion 22 may cover a front end of the fourth wiper arm 10d so as to add a fastening force of the fourth wiper arm 10d. The horizontal movement of the fourth wiper arm 10d may be restricted by the elastic protruding portion 2122 provided on the top surface 212 of the body portion 21, which will be described below.

As described above, the body portion 21 may have the side surface 211 including the restriction protrusion 2111, the first groove 2112, the second groove 2114, and the like so as to prepare for fastening of the wiper arms 10 having a variety of shapes. Particularly, to allow the second type wiper arm 10 not to interfere in vertical fastening while the restriction protrusion 2111 is placed to horizontally fasten the first type wiper arm 10, the first groove 2112 may be formed to be at least partially tilted.

An incision portion 2121 may be provided on the top surface 212 of the body portion 21. The incision portion 2121 may be provided to mount the spacer portion 24 which is used for fastening the wiper arm 10 having a relatively great width. This will be described below.

However, the incision portion 2121 may be omitted. In this case, the spacer portion 24 may be fastened to the adaptor 20 using a variety of unlimited coupling methods so as to fasten the wiper arm 10 having a great width.

The elastic protruding portion 2122 and the elastic piece 2123 may be provided on the top surface 212. The front end may be connected to the body portion 21 and a rear end may be provided as a free end so that the elastic protruding portion 2122 and the elastic piece 2123 have vertical elasticity.

The elastic protruding portion 2122 is a component which is inserted into the opening 102d or 102e provided in the first type wiper arm 10 (the fourth wiper arm 10d, the fifth wiper arm 10e, or the like) fastened to the body portion 21 horizontally and has a cross section smaller than that of the opening 102d or 102e.

The elastic protruding portion 2122 is forcibly pressed by the connection portion of the fourth wiper arm 10d when the fourth wiper arm 10d or the like is inserted into the body portion 21 and then is disposed at a position corresponding to the opening 102d of the fourth wiper arm 10d and elastically moves upward to be inserted into the opening 102d so as to prevent the fourth wiper arm 10d from being separated horizontally.

The elastic piece 2123 may be provided to be adjacent to the elastic protruding portion 2122, and the elastic protruding portion 2122 and the elastic piece 2123 may be provided to share the front end. Also, the elastic piece 2123 may be provided to have a shape surrounding a perimeter of the elastic protruding portion 2122 but is not limited thereto.

The elastic piece 2123 may be engaged with the insertion piece 104b provided on the first type wiper arm 10 (the second wiper arm 10b or the like) fastened to the body portion 21 horizontally. When the second wiper arm lab is fastened to the body portion 21, the insertion piece 104b is introduced below the elastic piece 2123 such that the elastic piece 2123 is surrounded by the connection portion of the second wiper arm 10b and restricted in upward movement. Accordingly, the locking portion 22, the second wiper arm 10b, the elastic piece 2123, and the insertion piece 104b are sequentially placed vertically so that vertical movement of the second wiper arm 10b may be restricted.

A hinge portion 213 for providing the locking portion 22 may be provided in front of the body portion 21. A pair of such hinge portions 213, which are spaced apart from each other widthwise, are provided to allow the locking portion 22 to rotate and each include a hinge shaft 2131 and a holding key 2132.

The hinge shaft 2131 is fastened to the locking portion 22 and forms a hinge center. The locking portion 22 may implement fastening of the wiper arm 10 while rotating clockwise on the basis of the drawing and may implement separation of the wiper arm 10 while rotating counterclockwise.

Here, the hinge portion 213 may use the holding key 2132 to suppress rotation of the locking portion 22 in a state in which the locking portion 22 implements fastening of the wiper arm 10. The holding key 2132 is held by an uneven portion 2211 provided on a rotational surface 221 of the locking portion 22 according to a rotational angle of the locking portion 22 and restricts rotation of the locking portion 22.

When the rotational surface 221 elastically moves inward due to an external pressure, the uneven portion 2211 may be released from the holding key 2132 so as to allow the locking portion 22 to rotate counterclockwise to expose the front end of the wiper arm 10.

An elastic bar (not shown) configured to connect the pair of hinge portions 213 to each other may be provided between the hinge portions 213. Engagement between the holding key 2132 and the uneven portion 2211 of the locking portion 22 may be firmly maintained by maintaining a state, in which the pair of hinge portions 213 are spaced apart, using the elastic bar. When an external pressure capable of resisting an elastic force of the elastic bar is applied to the locking portion 22, the uneven portion 2211 deviates from the holding key 2132 so as to allow the locking portion 22 to rotate counterclockwise.

The elastic leg 214 may be provided in the rear of the body portion 21 opposite to the hinge portion 213. The elastic leg 214 is provided to have an elastic force widthwise in the rear of the body portion 21 and protrudes elastically in comparison to the side surface 211 of the body portion 21 and may be held by a rear end of the first type wiper arm 10.

The holding end 102b or 102c may be provided on the first type wiper arm 10 (particularly, the second wiper aria 10b, the third wiper arm 10c, or the like). Here, when the second wiper arm 10b or the like is fastened to the body portion 21 horizontally, the holding end 102b or 102c passes over the elastic leg 214 and the elastic leg 214 protrudes elastically and restricts backward movement of the holding end 102b or 102c.

To this end, one surface (rear surface) of the elastic leg 214 to which the wiper arm 10 is fastened may be provided as a tilted surface or a curved surface to be naturally pressed inward by the connection portion of the wiper arm 10 and an opposite surface (front surface) thereof may be provided as a vertical surface, a tilted surface having an inclination greater than that of a front surface to prevent the wiper arm 10 or the like from being released from fastening.

A curved portion 215 may be formed between the pair of side surfaces 211 of the body portion 21. The curved portion 215 may have a convex shape to face an inner surface of the locking portion 22 and is provided to fasten the first wiper arm 10a among the second type wiper arms 10.

That is, the curved portion 215 may be provided to correspond to a curved shape of a ring-shaped connection portion of the first wiper arm 10a, and the connection portion of the first wiper arm 10a is coupled to surround top and bottom of the curved portion 215 when the first wiper arm 10a is fastened to the body portion 21.

Also, since the curved portion 215 of the body portion 21 may have a shape having a top or bottom blocked by the side surface 211, as the first wiper arm 10a is fastened to allow the connection portion to surround the curved portion 215, upward movement of the curved portion 215 may be blocked while simultaneously widthwise movement may be suppressed by the side surfaces 211 of the body portion 21.

A pair of hinge holes 216 provided on both the side surfaces 211 may be provided at the bottom side of the body portion 21. The hinge holes 216 are components used for fastening the adaptor 20 to the wiper blade and may be coupled to a bar-shaped rotational shaft 251 provided on the base portion 25.

Here, the hinge holes 216 may have a shape with an opened bottom as shown in FIG. 4 or the like but has a front-rear width of an opened bottom end smaller than a width of the rotational shaft 251 so that the rotational shaft 251 may be forcibly inserted into the hinge holes 216 and then be suppressed from being separated.

Also, the hinge holes 216 may have a shape with a closed bottom as shown in FIG. 8. In this case, the rotational shaft 251 provided on the base portion 25 may have a shape cut to be introduced into the hinge holes 216 and form a pair of protrusions. However, a width of the cut part of the rotational shaft 251 is formed to be smaller than a gap between the pair of hinge holes 216 so that the rotational shaft 251 may be inserted into the hinge holes 216 and then be fixed to be relatively stable.

That is, in the case of FIG. 4, the rotational shaft 251 is a bar shape passing through the pair of hinge holes 216 at once. On the other hand, in the case of FIG. 8, the rotational shaft 251 may be formed in a shape of a pair of protrusions fastened to the hinge holes 216.

As a structure of the hinge holes 216 and the rotational shaft 251, any structures capable of preventing the body portion 21 from being separated even when the body portion 21 rotates on the basis of a partial part (base portion 25) of the wiper blade may be used.

An elastic arm 217 may be provided on the body portion 21. The elastic arm 217 may be provided on the side surface 211 or the like of the body portion 21. The adaptor 20 according to the embodiment is provided to allow a variety of types of wiper arms 10 to be selectively couplable. Here, the wiper arms 10 may have different widths.

When a width of the body portion 21 is determined in preparation to couple the wiper arm 10 having a relatively small width, a gap is formed between the body portion 21 and the wiper arm 10 when the wiper arm 10 having a relatively great width is fastened so that a fastening force is decreased.

Accordingly, in the present invention, the elastic arm 217 configured to come into contact with an internal surface of the wiper arms 10 having different widths which are coupled to the body portion 21 may be provided to protrude from the side surface 211 of the body portion 21.

Here, a degree at which the elastic arm 217 is elastically introduced inward by the wiper arm 10 when the wiper arm 10 having a relatively great width is fastened may be formed to be smaller than a degree at which the elastic arm 217 is elastically introduced inward by the wiper arm 10 when the wiper arm 10 having a relatively small width is fastened.

In detail, the elastic arm 217 is provided such that a front end adjacent to the locking portion 22 is formed as a free end and has a shape protruding outward. Here, a part protruding from the elastic arm 217 is in simple contact with the inner surface of the connection portion of the wiper arm 10 instead of being structurally engaged therewith so as to reduce widthwise shaking of the connection portion of the wiper arm 10.

The elastic arm 217 may be provided as a cantilever arm shape which is a component elastically protruding from the body portion 21 toward the side surface 211 and pressed against the connection portion of the wiper arm 10. Here, one end connected to the body portion 21 may not be limited to a rear end.

Also, the elastic arm 217 may be provided on each of the side surfaces 211 of the body portion 21. A pair of such elastic arms 217 may have different shapes. As an example, the elastic arm 217 on one side may be provided so that a rear end is restricted and a front end is a free end. The elastic arm 217 on the other side may be provided so that a front end is restricted and a rear end is a free end or the like.

However, among a variety of types of wiper arms 10 described in the present invention, the elastic arm 217 may not come into contact with an inner surface of the wiper arm 10 (the fourth wiper arm 10d or the like) fastened using the spacer portion 24 or the wiper arm 10 (the first wiper arm 10a, the eighth wiper arm 10h, or the like) fastened using the cover portion 23.

The locking portion 22 may be provided rotatably on the body portion 21. The locking portion 22 may be provided like a cap shape. In detail, the locking portion 22 has a pair of rotational surfaces 221 rotatably coupled to the hinge portions 213. A cover surface (without a reference numeral) is provided between the pair of rotational surfaces 221, and one end of the cover surface covers the wiper arm 10 fastened to the body portion 21.

The rotational surface 221 of the locking portion 22 may be provided to be rotatable about the hinge portion 213. As an example, the hinge shaft 2131 provided on the hinge portion 213 is inserted into a hole of a hinge element 223 extending from the rotational surface 221 such that the rotational surface 221 may rotate about the hinge shaft 2131.

The uneven portion 2211 is provided on the rotational surface 221. The uneven portion 2211 may be provided such that an uneven part and a recessed part are adjacent to each other along a rotational direction of the locking portion 22. The uneven part may be provided, as described with the elastic leg 214, so that one side is tilted and the other side is vertical.

Accordingly, when the locking portion 22 rotates clockwise, the holding key 2132 passes over a tilted part of the uneven part of the uneven portion 2211 and is mounted on the recessed part, and the holding key 2132 comes into contact with a vertical part of the uneven part of the uneven portion 2211 so that counterclockwise rotation of the locking portion 22 may be suppressed.

However, when an external pressure (particularly, an elastic force of the elastic bar or higher) is applied to the rotational surface 221 in an inward direction, the vertical part of the uneven part of the uneven portion 2211 deviates from the holding key 2132 so that the counterclockwise rotation of the locking portion 22 may be allowed.

Here, the rotational surface 221 of the locking portion 22 may be provided so that a part where the uneven portion 2211 is provided has a button-like shape so as to allow an external pressure to be effectively applied to the uneven portion 2211.

A protruding element 2212 is provided on a surface of the rotational surface 221. The protruding element 2212 is a component configured to allow a user to grip the locking portion 22 to easily rotate the locking portion 22. Instead of having one protruding structure, coarseness may be imparted to the rotational surface 221 to allow the user to grip the locking portion 22.

On the cover surface between the pair of rotational surfaces 221, a cover element 222 configured to cover the front end of the connection portion of the wiper arm 10 and to prevent the wiper arm 10 from being separated may be provided. When the locking portion 22 is placed in a locked state, the cover element 222 may be placed at a position projected on the top surface of the wiper arm 10 coupled to the adaptor 20 so as to prevent the wiper arm 10 from deviating upward.

The cover element 222 may be provided to extend from the cover surface to the rear end and protrude more rearward than the rotational surface 221 so that steps are formed on both sides of the cover element 222. Here, a step on a lower side of the cover element 222 may be engaged with a step of the cover portion 23 which will be described below.

A hinge element 223 may extend from the rotational surface 221. The hinge element 223 may extend downward from the rotational surface 221 and include a hole formed therein. A hole is provided in the rotational surface 221 itself so that the hinge element 223 may be provided as a part of the rotational surface 221.

Referring to FIG. 9, the hinge shaft 2131 of the hinge portion 213 is inserted into the hole of the hinge element 223 provided below the rotational surface 221. Here, similar to the part described above with reference to FIG. 8 in a description of the rotational shaft 251 of the base portion 25, the hinge shaft 2131 having a pair of protrusions is provided to protrude from the pair of hinge portions 213. Also, at least a part of the hinge shaft 2131 may be chamfered to be partially tilted to be smoothly insertable into the hinge element 223.

On the other hand, referring to FIG. 10, the hinge element 223 of the locking portion 22 may extend downward from the rotational surface 221 but be provided in a center widthwise and the hinge shaft 2131 of the hinge portion 213 may be provided in a bar shape between the pair of hinge portions 213 so as to be similar to a part described with reference to FIG. 4 in a description of the rotational shaft 251 of the base portion 25. Here, the hinge element 223 has a shape incised widthwise to allow the bar-shaped hinge shaft 2131 to be insertable thereinto.

In the case of FIG. 9, the hinge shaft 2131 may be exposed outward. In the case of FIG. 10, the hinge shaft 2131 may not be exposed outward unless the locking portion 22 rotates counterclockwise. In the present invention, shapes or a coupling method of the hinge element 223, the hinge shaft 2313, and the like of the locking portion 22 are not limited to the above description and all structures in which the locking portion 22 is hinge-rotated about the hinge portion 213 of the body portion 21 may be applied.

The cover portion 23 is fastened to the body portion 21 to cover both the side surfaces 211 and the top surface 212 of the body portion 21. The cover portion 23 may be provided to have a width corresponding to that of the locking portion 22, and the opening 231 may be provided at a part corresponding to the through hole 2113 of the body portion 21.

The cover portion 23 has a step on a front end. Here, as the cover element 222 protrudes from the locking portion 22, the step of the cover portion 23 may be engaged with a step provided below the cover element 222.

When a gap between the body portion 21 and the wiper arm 10 is not released by the spacer portion 24 which will be described below, that is, when a width of the connection portion of the wiper arm 10 is relatively great, the cover portion 23 may be used.

Otherwise, when a width of the wiper arm 10 is smaller than a width of the body portion 21, the cover portion 23 may be used to allow the wiper arm 10 to be mounted and suppressed from widthwise movement.

As an example, although the first wiper arm 10a may be fastened to the adaptor 20 while the cover portion 23 is not fastened to the body portion 21, as shown in FIG. 11, the first wiper arm 10a may be fastened to the adaptor 20 while the cover portion 23 is coupled to the body portion 21. Particularly, since both sides of the cover portion 23 protrude upward from the top surface widthwise, a furrow may be formed at a central part of the top surface. The first wiper arm 10a may be mounted on the furrow of the cover portion 23 and widthwise movement thereof may be restricted.

Otherwise, in the case of the eighth wiper arm 10h, when a width of the lid portion 102h is so great as to not be adequate to fix the body portion 21, the lid portion 102h of the eighth wiper arm 10h may be fastened to surround the cover portion 23 while the cover portion 23 is coupled to the body portion 21.

The spacer portion 24 may be disposed while being overlapped with the side surface 211 of the body portion 21 to compensate for a gap between the wiper arm 10 and the side surface 211 of the body portion 21 when the wiper arm 10 having a relatively great width (for example, the fourth wiper arm 10d or the like) in comparison to the wiper arm 10 (the third wiper arm 10c or the like) having the front end facing the restriction protrusion 2111 or the wiper arm 10 (the sixth wiper arm 10f or the like) having the internal protrusion 101f introduced into the first groove 2112 is fastened.

The spacer portion 24 includes at least one layer portion 241 overlapped with at least one of both the side surfaces 211 of the body portion 21. The layer portion 241 is provided as a plane shape having a certain thickness to increase a width of the body portion 21 and placed to be parallel to the side surface 211 of the body portion 21 so as to relieve a gap which may occur between the side surfaces 211 of the body portion 21 and the inner surface of the wiper arm 10.

Here, the layer portion 241 may be provided on the side surface 211 of the body portion 21 to not interfere with structures used for coupling with the wiper arm 10. As an example, the layer portion 241 may have a shape with a part corresponding to the through hole 2113 provided in the side surface 211 of the body portion 21 that recedes or passes through.

In the case of the eighth wiper arm 10h fastened using the through hole 2113, since the cover portion 23 is used due to the lid portion 102h having a great width, it is possible to maintain a state in which the spacer portion 24 is fastened to the body portion 21. However, in the case of the seventh wiper arm 10g which uses the through hole 2113 but has the lid portion 102h having a smaller width than that of the eighth wiper arm 10h, since it is impossible to fasten the lid portion 102g when the spacer portion 24 is maintained, the spacer portion 24 may be separated from the body portion 21 when the seventh wiper arm 10g is fastened to the body portion 21.

That is, in consideration of the wiper arm 10 which is fastenable while the spacer portion 24 is provided on the body portion 21, the layer portion 241 may determine interference bet fastening elements of the wiper arm 10 provided on the side surface 211 of the body portion 21.

Also, the layer portion 241 may expose the second groove 2114 configured to allow the internal protrusion 101d or 101e of the fourth wiper arm 10d or the fifth wiper arm 10e to be introduced. That is, a bottom end of the layer portion 241 is located above the second groove 2114 so that the layer portion 241 is provided not to cover the second groove 2114.

Since the second groove 2114 is used for coupling the wiper arm 10 which requires the spacer portion 24, the layer portion 241 exposes the second groove 2114.

However, the fourth wiper arm 10d which is coupled when the spacer portion 24 is used may not use the first groove 2112. The spacer portion 24 may need to be eliminated from the body portion 21 when the sixth wiper arm 10f or the like using the first groove 2112 is fastened. Accordingly, it will be allowed that the layer portion 241 is provided to cover the first groove 2112.

The spacer portion 24 may be detachably provided on the body portion 21 and may be detachably attached to the side surface 211 of the body portion 21 widthwise. In this case, a structure such as an unevenness or the like capable of implementing engagement may be applied between the spacer portion 24 and the side surface 211 of the body portion 21.

When the wiper arm 10 is coupled while the spacer portion 24 is placed on the side surface 211 of the body portion 21, since the spacer portion 24 is located between the side surface 211 of the body portion 21 and the inner surface of the wiper arm 10, there is hardly any concern of separation. Accordingly, a coupling force between the spacer portion 24 and the body portion 21 may be adequate when the spacer portion 24 is not separated downward while the wiper arm 10 is coupled to the body portion 21.

Otherwise, the spacer portion 24 may be coupled to the body portion 21 vertically. Here, the spacer portion 24 may include a pair of such layer portions 241 overlapped with both the side surfaces 211 of the body portion 21 and includes a leg portion 242 configured to connect the pair of layer portions 241 widthwise. Here, a width between the layer portions 241 connected by the leg portion 242 may correspond to the width of the body portion 21.

The body portion 21 may include the incision portion 2121 for mounting the spacer portion 24 on the top surface 212. That is, even when the spacer portion 24 including the leg portion 242 is fastened to the body portion 21, the leg portion 242 of the spacer portion 24 may be introduced into the incision portion 2121 to prevent a vertical height from being increased by the spacer portion 24.

In addition to a method of coupling the layer portion 241 to the side surface 211 of the body portion 21 directly or indirectly using the leg portion 242, any structures of the spacer portion 24 may be used as long as a gap between the wiper arm 10 and the side surface 211 of the body portion 21 is filled up.

For reference, when the spacer portion 24 is used, the elastic arm 217 provided on the side surface 211 of the body portion 21 may not come into contact with the inner surface of the wiper arm 10 as described above.

The base portion 25 is fixed to the wiper blade. The base portion 25 may be fixed to a central part of the wiper blade and provided to be structurally fastened to a central part of the coupling cover or the cover portion 23 as described above.

The base portion 25 forms a hinge center f the body portion 21. As stated above in a part describing the hinge hole 216 of the body portion 21, the base portion 25 passes through the pair of hinge holes 216 at once and includes the bar-shaped rotational shaft 251 or the rotational shaft 251 having the pair of protrusions fastened to the hinge holes 216 of the body portion 21. The body portion 21 may be rotatably fastened to the rotational shaft 251 of the base portion 25 and may be provided on the base portion 25 to be hinge-rotated.

Hereinafter, a method of selectively coupling a variety of types of wiper arms 10 to one adaptor 20 will be described with reference to FIGS. 11 to 18.

Referring to FIG. 11, when the first wiper arm 10a having the ring shape is intended to be vertically fastened to the body portion 21, the cover portion 23 may be coupled or not coupled to the body portion 21. That is, the cover portion 23 may be used selectively in the first wiper arm 10a.

The first wiper arm 10a moves downward while an end of the connection portion is located in front of the curved portion 215 of the body portion 21. The first wiper arm 10a moves rightward on the basis of the drawing while a top of the connection portion comes into contact with or is adjacent to a top end of the curved portion 215.

In this case, a ring part of the first wiper arm 10a is engaged with the curved portion 215 of the body portion 21. A curvature of the ring part of the first wiper arm 10a may be provided corresponding to a curvature of the curved portion 215 of the body portion 21. Otherwise, the curvature of the first wiper arm 10a is formed to be smaller so that the first wiper arm 10a may be fastened primarily due to forcible fitting between the curvatures.

The ring part of the first wiper arm 10a is mounted on the curved portion 215, and then the locking portion 22 is rotated clockwise. The uneven portion 2211 of the locking portion 22 is held by the holding key 2132 of the hinge portion 213 so that rotation of the locking portion 22 is blocked and the cover element 222 of the locking portion 22 covers the front end of the first wiper arm 10a.

Accordingly, vertical and horizontal movement of the first wiper arm 10a may be blocked by the locking portion 22 and engagement between the ring part and the curved portion 215. Also, widthwise movement of the first wiper arm 10a may be blocked by the furrow structure formed on the top surface of the cover portion 23 as described above. Even when the cover portion 23 is not used, the widthwise movement of the first wiper arm 10a may be blocked by a structure of the body portion 21 itself.

Referring to FIG. 12, the second wiper arm 10b may be fastened to the body portion 21 horizontally. When being fastened, the protruding end 101b of the second wiper arm 10b is provided at a position at which the locking portion 22 will be covered and the holding end 102b of the second wiper arm 10b is engaged with the elastic leg 214 and the front end faces the restriction protrusion 2111.

Also, the insertion piece 104b provided in the opening 103b of the second wiper arm 10b is introduced below the elastic piece 2123 of the body portion 21 and engaged with the elastic piece 2123. Here, engagement between the insertion piece 104b and the elastic piece 2123 may be seen with naked eyes through the opening 103b.

Covering the front end of the second wiper arm 10b by rotating the locking portion 22 clockwise is the same as FIG. 11.

Accordingly, in the second wiper arm 10b, vertical movement may be restricted by the locking portion 22 covering the front end and the engagement between the insertion piece 104b and the elastic piece 2123, and horizontal movement may be restricted by the restriction protrusion 2111 and the engagement between the holding end 102b and the elastic leg 214.

Referring to FIG. 13, the third wiper arm 10c is fastened similarly to the second wiper arm 10b. The holding end 102c of the third wiper arm 10c is provided to be tilted so as to more firmly implement restriction of movement in comparison to the second wiper arm 10b.

Accordingly, in the third wiper arm 10c, vertical movement is restricted by the locking portion 22 covering the front end and horizontal movement is restricted by the restriction protrusion 2111 and engagement between the holding end 102c and the elastic leg 214.

Referring to FIG. 14, the fourth wiper arm 10d is inserted into the body portion 21 horizontally. Here, since a width of the fourth wiper arm 10d is provided to be relatively greater than a width of the body portion 21, a gap may be formed between the fourth wiper arm 10d and the side surface 211 of the body portion 21.

When the gap is formed, there is concern that the wiper arm 10 may shake widthwise and a fastening force may be decreased. Accordingly, in the embodiment, the spacer portion 24 may be fastened to the body portion 21 and then the fourth wiper arm 10d may be coupled to the body portion 21.

Also, the opening 102d is provided in the fourth wiper arm 10d. The opening 102d of the fourth wiper arm 10d may be engaged with the elastic protruding portion 2122 provided on the top surface 212 of the body portion 21. That is, when the fourth wiper arm 10d is fastened to the body portion 21 horizontally, the elastic protruding portion 2122 of the body portion 21 may be pushed by the connection portion of the fourth wiper arm 10d and then be disposed and protrude at a position of the opening 102d so as to be introduced into the opening 102d and be engaged with the opening 102d.

Particularly, the elastic protruding portion 2122 may be a shape having a strong suppressing force in a direction in which the fourth wiper arm 10d is released from being fastened. On the other hand, the elastic protruding portion 2122 may have a structure of being elastically pressurized easily in a direction, in which the fourth wiper arm 10d is fastened, so as to naturally allow the fourth wiper arm 10d to be coupled.

The internal protrusion 101d is provided on the connection portion of the fourth wiper arm 10d and is guided along the second groove 2114 provided on the side surface 211 of the body portion 21. Although the first groove 2112 is covered by the spacer portion 24, the fourth wiper arm 10d may be fastened using the second groove 2114.

Although the from end of the fourth wiper arm 10d is covered by the cover element 222 of the locking portion 22, the fourth wiper arm 10d may be introduced below the cover element 222 without interfering with the locking portion 22 when the fourth wiper arm 10d is fastened.

Accordingly, the fourth wiper arm 10d may be coupled to the body portion 21 horizontally while the locking portion 22 is in a lock state. Also, since a width of the fourth wiper arm 10d may be greater than a width of the locking portion 22, a rear end of the rotational surface 221 of the locking portion 22 may face the front end of the fourth wiper arm 10d.

Through this fastening, horizontal movement of the fourth wiper arm 10d may be blocked by the locking portion 22 and engagement between the elastic protruding portion 2122 and the opening 102d and vertical movement thereof may be blocked by the internal protrusion 101d mounted on the second groove 2114.

Referring to FIG. 15, the same fastening method is used for the fifth wiper arm 10e except a small width in comparison to that of the fourth wiper arm 10d. Accordingly, unlike that shown in FIG. 14, the fifth wiper arm 10e may be fastened to the body portion 21 without the spacer portion 24, and others are the same as in the above description of the fourth wiper arm 10d.

Referring to FIG. 16, the sixth wiper arm 10f may be fastened to the body portion 21 vertically. The sixth wiper arm 10f includes the internal protrusion 101f provided inside the connection portion. However, the internal protrusion 101f of the sixth wiper arm 10f may be provided on the side surface of the connection portion above a bottom end and may be placed at a position not inserted into the second groove 2114.

The internal protrusion 101f may be introduced into the first groove 2112 provided in the side surface 211 of the body portion 21. However, when the first groove 2112 is provided to be vertical to fasten the sixth wiper arm 10f to the body portion 21 vertically, the front end of the sixth wiper arm 10f may be held by the restriction protrusion 2111 provided on the body portion 21.

Accordingly, since the first groove 2112 of the body portion 21 is provided to be tilted as described above, the first groove 2112 may deviate in a direction farther away from the restriction protrusion 2111 toward the outside portion into which the internal protrusion 101f is inserted in comparison to the inside portion where the insertion of the internal protrusion 101f is blocked.

Accordingly, although the internal protrusion 101f of the sixth wiper arm 10f is introduced into the outside portion of the first groove 2112, the sixth wiper arm 10f may not interfere with the restriction protrusion 2111 in a fastening process. However, corresponding to the titled shape of the first groove 2112, a direction in which the sixth wiper arm 10f is fastened may be a tilted vertical direction not a perpendicular vertical direction.

When the internal protrusion 101f of the sixth wiper arm 10f is located on the inside portion of the first groove 2112, the restriction protrusion 2111 may be located on the recessed portion 102f provided in the connection portion of the sixth wiper arm 10f. Accordingly, when the sixth wiper arm 10f is fastened, the restriction protrusion 2111 of the body portion 21 is mounted on the recessed portion 102f of the sixth wiper arm 10f without interfering with the internal protrusion 101f of the sixth wiper arm 10f.

Subsequently, as the sixth wiper arm 10f moves horizontally, the internal protrusion 101f moves into the holding path 2112b of the first groove 2112 so that vertical movement of the sixth wiper arm 10f may be restricted by engagement between the internal protrusion 101f and the holding path 2112b.

As the locking portion 22 in a lock-released state rotates clockwise and changes to a lock state to cover the front end of the sixth wiper arm 10f, upward movement may be restricted by the locking portion 22.

Accordingly, vertical movement of the sixth wiper arm 10f may be restricted by the locking portion 22 and engagement between the internal protrusion 101f and the holding path 2112b, and horizontal movement thereof may be restricted as the front end of the sixth wiper arm 10f comes into contact with the locking portion 22.

Referring to FIG. 17, the seventh wiper arm 10g may include the pin 101g and be fastened to the body portion 21 widthwise. Since the through hole 2113 is provided in the body portion 21, the seventh wiper arm 10g is fastened in a direction in which the pin 101g is inserted into the through hole 2113.

Subsequently, the lid portion 102g provided on the seventh wiper arm 10g surrounds the top surface 212 or the like of the body portion 21. To this end, the seventh vesper arm 10g may rotate by a certain angle on the basis of the pin 101g while the pin 101g passes through the through hole 2113.

The lid portion 102g may have a shape extending widthwise to correspond to the width of the body portion 21 and having a bent end to surround the side surface 211 of the body portion 21. The lid portion 102g may not be bent depending on a fastening force between the pin 101g and the through hole 2113.

The seventh wiper arm 10g may be provided not to be covered by the locking portion 22. That is, the seventh wiper arm 10g may be coupled to the body portion 21 while the locking portion 22 is in a lock state. Here, all vertical and lateral movement of the seventh wiper arm 101g may be blocked by fastening between the pin 10g and the through hole 2113, and additionally, widthwise movement thereof may be blocked by the lid portion 102g.

Referring to FIG. 18, the eighth wiper arm 10h may be provided to include the pin 101h and the lid portion 102h similarly to the seventh wiper arm 10g. However, although a slight different may be in a shape of the connection portion, a fastening method is similar to that of the seventh wiper arm 10g.

The lid portion 102h of the eighth wiper arm 10h may be provided to have a great width in comparison to the seventh wiper arm 10g. In this case, the lid portion 102h may have the width greater than that of the body portion 21. Accordingly, the adaptor 20 may couple the eighth wiper arm 10h by fastening the spacer portion 24 to the body portion 21.

Otherwise, the cover portion 23 is fastened to the body portion 21 to secure an adequate width and then the eighth wiper arm 10h is coupled thereto so that the lid portion 102h of the eighth wiper arm 10h may be fastened to the adaptor 20 adequately.

Here, when a width of the lid portion 102h is great, since a strength of the lid portion 102h itself may become a problem, the lid portion 102h may be prepared for deformation by applying a partial uneven structure.

Vertical and horizontal movement of the eighth wiper arm 10h may be restricted by engagement between the pin 101h and the through hole 2113 (and the opening 231 of the cover portion 23), and widthwise movement thereof may be additionally restricted by the lid portion 102h.

As described above, in the embodiment, a structure and a shape of the adaptor 20 have been improved to couple two or more types of wiper arms 10 having a variety of forms. Particularly, the restriction protrusion 2111 facing the front end of the wiper arm 10 fastened horizontally may be included and a shape of the first groove 2112 may be limited to be tilted so as to smoothly couple the wiper arm 10 fastened vertically.

According to the present invention, an adaptor for assembling a wiper blade, a wiper blade assembly, and a wiper device are configured to easily fasten a plurality of wiper arms without a problem by limiting a shape of a groove or the like so that a component to be engaged with a wiper arm fastened horizontally is not to interfere with a wiper arm fastened vertically.

Although the exemplary embodiments of the present invention have been described above, these are merely for describing the present invention in detail and the present invention is not limited thereto. Also, it is apparent that a variety of modifications and improvements thereof may be made by one of ordinary skill in the art without departing from the technical concept of the present invention.

All simple modifications and changes of the present invention are included within the scope of the present invention, and a detailed scope of the present invention will be defined by the following claims.

What is claimed is:

1. An adaptor configured for coupling a wiper blade to two or more types of wiper arms, the adaptor comprising:

a body portion configured to be coupled to the wiper blade, to a first type wiper arm horizontally and to a second type wiper arm vertically; and a locking portion rotatably provided on the body portion and configured to cover a front end of the first type of wiper arm or the second type of the wiper arm when the first type of the wiper arm or the second type of the wiper arm is coupled to the adaptor, wherein the body portion comprises a restriction protrusion and a groove on a side surface thereof, wherein the restriction protrusion protrudes from the side surface of the body portion to face a front end of the first type wiper arm, so that the restriction protrusion is configured to suppress horizontal insertion of the first type wiper arm when the first type wiper arm is coupled to the body portion, wherein the groove is recessed at the side surface of the body portion and configured to guide and hold an internal protrusion provided inside the second type wiper arm when the second type wiper arm is coupled to the body portion, wherein the groove is provided to be biased in a direction farther from the restriction protrusion toward an outside portion into which the internal protrusion can be inserted in comparison to an inside portion where the insertion of the internal protrusion is blocked, so that the restriction protrusion does not interfere with the second type wiper arm when the internal protrusion of the second type wiper arm is guided into the outside portion of the groove, wherein the groove comprises:

a guide path comprising the outside portion into which the internal protrusion can be inserted and the inside portion where the insertion of the internal protrusion is blocked; and a holding path bent from the guide path and extending horizontally, wherein the guide path is provided to be tilted toward the locking portion from the outside portion toward the inside portion, and wherein the holding path is bent at the inside portion of the guide path at an acute angle and horizontally extends in a direction away from the locking portion to an end lying beneath the guide path which defines spaced upper and lower surfaces.

2. The adaptor of claim 1, wherein in the groove, a distance between the restriction protrusion and a front end most adjacent to the locking portion is provided to be smaller than a distance between the internal protrusion of the second type wiper arm and a front end of the second type wiper arm.

3. The adaptor of claim 1, wherein in the body portion, a hinge portion is provided in front so that the locking portion rotates; and an elastic leg, which is elastically protruding and being held by a rear end of the first type wiper arm, is provided in the rear.

4. The adaptor of claim 3, wherein the hinge portion comprises:

a hinge shaft fastened to the locking portion; and a holding key held by an uneven portion of the locking portion depending on a rotational angle of the locking portion to restrict rotation of the locking portion.

5. The adaptor of claim 4, wherein when the uneven portion elastically moves due to an external pressure, the uneven portion is separated from the holding key so that the locking portion is allowed to rotate in a direction in which the front end of the first type of the wiper arm or the second type of the wiper arm is exposed.

6. The adaptor of claim 1, wherein in the body portion, an elastic arm, which comes into contact with inner surfaces of the wiper arms having different widths and coupled to the body portion and is elastically introduced inward, is provided to protrude on the side surface.

7. The adaptor of claim 6, wherein in the elastic arm, a front end adjacent to the locking portion is provided in a form of a free end, and the front end has a shape protruding outward.

8. The adaptor of claim 1, further comprising a spacer portion disposed to be overlapped with the side surface of the body portion to compensate for a gap between the side surface of the body portion and a third type wiper arm having a great width in comparison to the first type wiper arm or the second type wiper arm when the third type wiper arm is fastened, and wherein an incision portion provided to mount the spacer portion is provided on a top surface of the body portion.

9. The adaptor of claim 8, wherein in the body portion, a through hole, into which a pin of the third type wiper arm fastened widthwise is inserted, is provided on the side surface.

10. The adaptor of claim 9, wherein the spacer portion comprises:
a pair of layer portions overlapped with both side surfaces of the body portion; and
a leg portion configured to connect the pair of layer portions and introduced into the incision portion, and
wherein the layer portions each have a shape with a caved portion corresponding to the through hole.

11. The adaptor of claim 1, further comprising a cover portion which is fastened to the body portion to cover both side surfaces and a top surface of the body portion, which is provided to have a width corresponding to that of the locking portion, and which includes an opening at a part corresponding to a through hole.

12. The adaptor of claim 1, wherein in the body portion, a curved portion is provided between both side surfaces to hold a third type wiper arm having a ring-shaped front end.

13. A wiper blade assembly comprising:
a wiper blade comprising a contact member, which is pressed against a surface of a target to be pressed against; and
the adaptor according to claim 1, which is fastened to the wiper blade,
wherein the adaptor further comprises a base portion fixed to the wiper blade, and
wherein the body portion is fastened to the base portion to hinge-rotate.

14. The wiper blade assembly of claim 13, wherein the body portion comprises a pair of hinge holes provided in both side surfaces, and
wherein the base portion comprises a bar-shaped rotational shaft passing through the pair of hinge holes at once or a rotational shaft having a shape of a pair of protrusions which are fastened to the pair of hinge holes, respectively.

* * * * *